(12) United States Patent
Saeki et al.

(10) Patent No.: US 12,467,661 B2
(45) Date of Patent: Nov. 11, 2025

(54) CASCADE UNIT AND REFRIGERATION CYCLE APPARATUS

(71) Applicant: DAIKIN INDUSTRIES, LTD., Osaka (JP)

(72) Inventors: Kumiko Saeki, Osaka (JP); Yuta Iyoshi, Osaka (JP); Yoshiki Yamanoi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/622,485

(22) Filed: Mar. 29, 2024

(65) Prior Publication Data

US 2024/0240838 A1 Jul. 18, 2024

Related U.S. Application Data

(63) Continuation of application No. PCT/JP2022/035456, filed on Sep. 22, 2022.

(30) Foreign Application Priority Data

Sep. 30, 2021 (JP) .................................. 2021-161997

(51) Int. Cl.
*F25B 7/00* (2006.01)
*F24F 11/89* (2018.01)
(Continued)

(52) U.S. Cl.
CPC ................ *F25B 7/00* (2013.01); *F24F 11/89* (2018.01); *F25B 9/008* (2013.01); *H05K 7/20145* (2013.01)

(58) Field of Classification Search
None
See application file for complete search history.

(56) References Cited

U.S. PATENT DOCUMENTS

2003/0167791 A1* 9/2003 Chordia .................. F25B 9/008
62/502
2007/0291451 A1* 12/2007 Takenoshita ............ G06F 1/203
361/709
(Continued)

FOREIGN PATENT DOCUMENTS

EP 2 672 204 A1 12/2013
JP 4-86436 A 3/1992
(Continued)

OTHER PUBLICATIONS

International Search Report for PCT/JP2022/035456 (PCT/ISA/210) mailed on Nov. 15, 2022.
(Continued)

*Primary Examiner* — Jerry-Daryl Fletcher
*Assistant Examiner* — Daniel C Comings
(74) *Attorney, Agent, or Firm* — BIRCH, STEWART, KOLASCH & BIRCH, LLP

(57) ABSTRACT

A cascade unit and a refrigeration cycle apparatus are capable of cooling an electric component. The cascade unit of the refrigeration cycle apparatus includes a primary-side refrigerant circuit that includes a primary-side heat exchanger and in which a primary-side refrigerant flows, a secondary-side refrigerant circuit that includes a secondary-side compressor and a utilization-side heat exchanger and in which a secondary-side refrigerant flows, and a cascade heat exchanger that causes the primary-side refrigerant and the secondary-side refrigerant to exchange heat with each other, the cascade unit including the secondary-side compressor, the cascade heat exchanger, a first electric component, a second electric component, a third electric component, and an electric component fan, and a cascade casing that accommodates the secondary-side compressor, the first electric component, and the electric component fan.

17 Claims, 13 Drawing Sheets

(51) Int. Cl.
*F25B 9/00* (2006.01)
*H05K 7/20* (2006.01)

(56) References Cited

U.S. PATENT DOCUMENTS

| | | | |
|---|---|---|---|
| 2009/0081940 A1* | 3/2009 | Jang | F24F 1/22 |
| | | | 454/184 |
| 2009/0120117 A1* | 5/2009 | Martin | F25B 25/005 |
| | | | 62/529 |
| 2012/0118530 A1* | 5/2012 | Yamashita | F24F 3/06 |
| | | | 165/58 |
| 2015/0338136 A1* | 11/2015 | Suzuki | F25B 13/00 |
| | | | 62/129 |
| 2016/0258636 A1* | 9/2016 | Kim | F24F 1/24 |
| 2018/0043749 A1* | 2/2018 | Lim | B60H 1/00521 |
| 2019/0024910 A1* | 1/2019 | Jung | F24F 1/027 |
| 2019/0212018 A1* | 7/2019 | Kim | F24F 13/222 |
| 2020/0149785 A1 | 5/2020 | Kojima | |
| 2021/0262691 A1* | 8/2021 | Jang | F24F 13/20 |
| 2022/0268499 A1 | 8/2022 | Yamaguchi et al. | |

FOREIGN PATENT DOCUMENTS

| | | | | |
|---|---|---|---|---|
| JP | 05-203235 A | * | 8/1993 | F24F 11/02 |
| JP | 2010-266132 A | | 11/2010 | |
| JP | 2019-20087 A | | 2/2019 | |
| JP | 2020-180709 A | | 11/2020 | |
| WO | WO 2012/121326 A1 | | 9/2012 | |
| WO | WO 2021/044548 A1 | | 3/2021 | |

OTHER PUBLICATIONS

International Preliminary Report on Patentability and English translation of the Written Opinion of the International Searching Authority for International Application No. PCT/JP2022/035456, dated Apr. 11, 2024.

Extended European Search Report for European Application No. 22876055.9, dated Dec. 16, 2024.

* cited by examiner

CASCADE UNIT AND REFRIGERATION CYCLE APPARATUS

CROSS REFERENCE TO RELATED APPLICATIONS

This application is a Continuation of PCT International Application No. PCT/JP2022/035456, filed on Sep. 22, 2022, which claims priority under 35 U.S.C. § 119(a) to Patent Application No. JP 2021-161997, filed in Japan on Sep. 30, 2021, all of which are hereby expressly incorporated by reference into the present application.

TECHNICAL FIELD

The present disclosure relates to a cascade unit and a refrigeration cycle apparatus.

BACKGROUND ART

Conventionally, an outdoor unit of a refrigeration cycle apparatus includes a compressor, an outdoor heat exchanger in which a refrigerant flows, a fan that supplies an air flow to the outdoor heat exchanger, an electric component box including an electric component for controlling a control target such as the compressor, and the like.

For example, in an outdoor unit described in Patent Literature 1 (JP 2020-180709 A), a heat sink for radiating heat is provided in an electric component box, and a part of an air flow by a fan sent to an outdoor heat exchanger is supplied to the heat sink to cool the electric component.

SUMMARY

A cascade unit according to a first aspect is a cascade unit of a refrigeration cycle apparatus. The refrigeration cycle apparatus includes a first circuit, a second circuit, and a cascade heat exchanger. A heat medium that carries heat flows in the first circuit. The first circuit includes a first heat exchanger. The first heat exchanger causes a heat source and the heat medium to exchange heat with each other. The second circuit includes a compressor and a second heat exchanger that exchanges heat with indoor air. The refrigerant flows in the second circuit. The cascade heat exchanger exchanges heat between the heat medium flowing in the first circuit and the refrigerant flowing in the second circuit. The cascade unit includes the compressor, the cascade heat exchanger, an electric component, a fan, and a cascade casing. The fan generates an air flow around the electric component. The cascade casing accommodates the compressor, the electric component, and the fan.

BRIEF DESCRIPTION OF THE DRAWINGS

DESCRIPTION OF EMBODIMENTS (1) Configuration of Refrigeration Cycle Apparatus FIG. 1 is a schematic configuration diagram of a refrigeration cycle apparatus 1. FIG. 2 is a schematic functional block configuration diagram of the refrigeration cycle apparatus 1.

Figure 1:
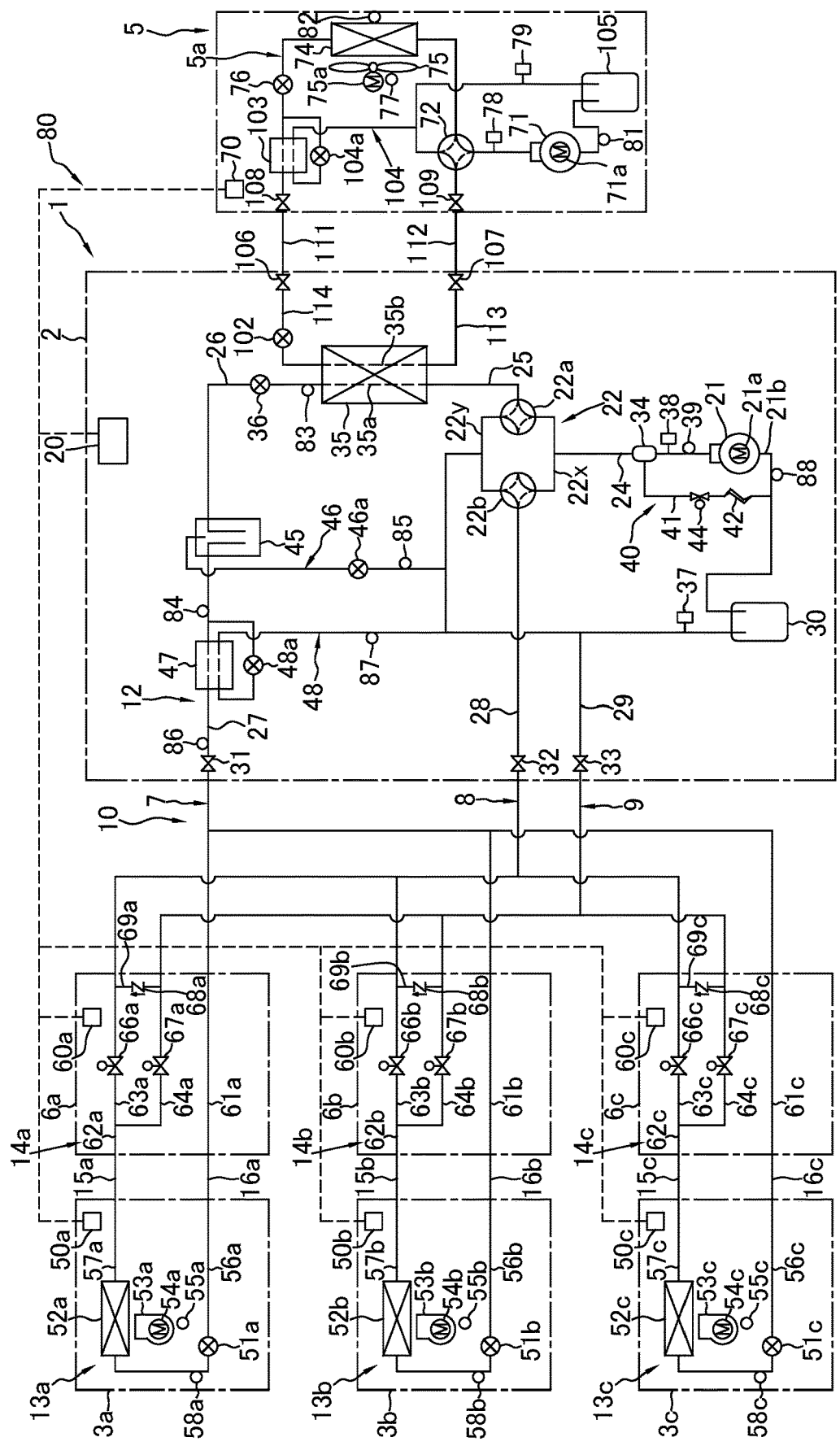
FIG. 1 is a schematic configuration diagram of a refrigeration cycle apparatus.
Figure 2:
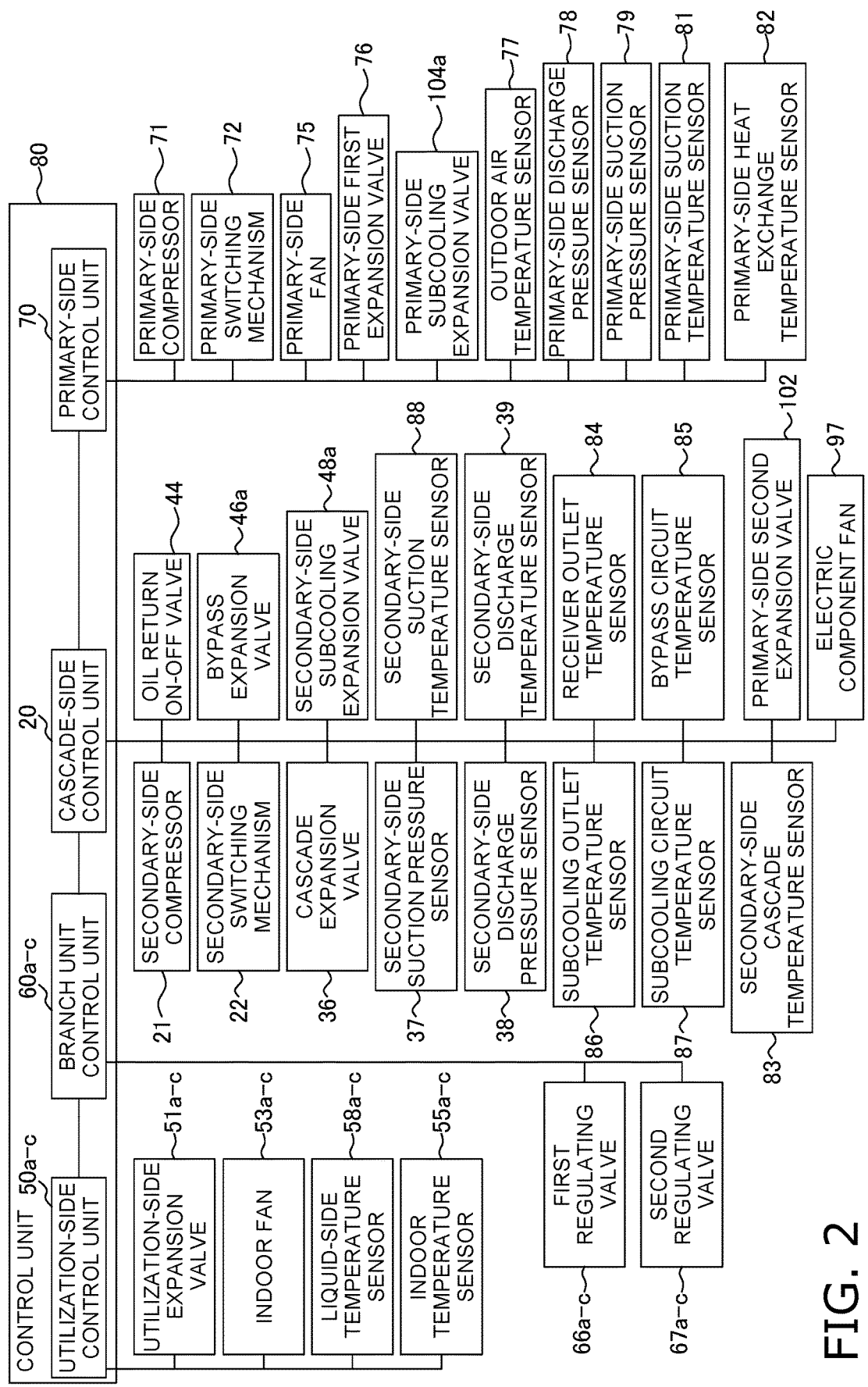
FIG. 2 is a schematic functional block configuration diagram of the refrigeration cycle apparatus.

The refrigeration cycle apparatus 1 is an apparatus used for cooling and heating of an indoor space in a building or the like by performing vapor compression refrigeration cycle operation.

The refrigeration cycle apparatus 1 includes a binary refrigerant circuit including a vapor compression primary-side refrigerant circuit 5a (corresponding to a first circuit) and a vapor compression secondary-side refrigerant circuit 10 (corresponding to a second circuit), and performs a binary refrigeration cycle. In the present embodiment, in the primary-side refrigerant circuit 5a, for example, R32 or R410A (corresponding to a heat medium) is sealed as a refrigerant. The secondary-side refrigerant circuit 10 encloses carbon dioxide (corresponding to a refrigerant) as a refrigerant. The primary-side refrigerant circuit 5a and the secondary-side refrigerant circuit 10 are thermally connected via a cascade heat exchanger 35 described later.

The refrigeration cycle apparatus 1 is configured by connecting a primary-side unit 5, a cascade unit 2, a plurality of branch units 6a, 6b, and 6c, and a plurality of utilization units 3a, 3b, and 3c to each other via pipes. The primary-side unit 5 and the cascade unit 2 are connected via a primary-side first connection pipe 111 and a primary-side second connection pipe 112. The cascade unit 2 and the plurality of branch units 6a, 6b, and 6c are connected via three connection pipes, namely, a secondary-side second connection pipe 9, a secondary-side first connection pipe 8, and a secondary-side third connection pipe 7. The plurality of branch units 6a, 6b, and 6c and the plurality of utilization units 3a, 3b, and 3c are connected via first connecting tubes 15a, 15b, and 15c and second connecting tubes 16a, 16b, and 16c. The present embodiment provides the single primary-side unit 5. The present embodiment provides the single cascade unit 2. The plurality of utilization units 3a, 3b, and 3c according to the present embodiment includes three utilization units, namely, the first utilization unit 3a, the second utilization unit 3b, and the third utilization unit 3c. In the present embodiment, the plurality of branch units 6a, 6b, and 6c is three branch units of the first branch unit 6a, the second branch unit 6b, and the third branch unit 6c.

In the refrigeration cycle apparatus 1, the utilization units 3a, 3b, and 3c can individually perform cooling operation or heating operation, and heat can be recovered between the utilization units by sending a refrigerant from the utilization unit performing the heating operation to the utilization unit performing the cooling operation. Specifically, heat is recovered in the present embodiment by performing cooling main operation or heating main operation of simultaneously performing cooling operation and heating operation. In addition, the refrigeration cycle apparatus 1 is configured to balance heat loads of the cascade unit 2 in accordance with entire heat loads of the plurality of utilization units 3a, 3b, and 3c also in consideration of the heat recovery (the cooling main operation or the heating main operation).

(2) Primary-Side Refrigerant Circuit

The primary-side refrigerant circuit 5a includes a primary-side compressor 71 (corresponding to a first compressor), a primary-side switching mechanism 72, a primary-side heat exchanger 74 (corresponding to a first heat exchanger), a primary-side first expansion valve 76, a primary-side subcooling heat exchanger 103, a primary-side subcooling circuit 104, a primary-side subcooling expansion valve 104a, a first liquid shutoff valve 108, the primary-side first connection pipe 111, a second liquid shutoff valve 106, the second refrigerant pipe 114, a primary-side second expansion valve 102, the cascade heat exchanger 35 shared with the secondary-side refrigerant circuit 10, a first refrigerant pipe 113, a second gas shutoff valve 107, the primary-side second connection pipe 112, a first gas shutoff valve 109, and a primary-side accumulator 105. This primary-side refrigerant circuit 5a specifically includes a primary-side flow path 35b of the cascade heat exchanger 35.

The primary-side compressor 71 is a device for compressing a primary-side refrigerant, and includes, for example, a scroll type or other positive-displacement compressor whose operating capacity can be varied by controlling an inverter for a compressor motor 71a.

The primary-side accumulator 105 is provided at a halfway portion of the suction flow path connecting the primary-side switching mechanism 72 and a suction side of the primary-side compressor 71.

When the cascade heat exchanger 35 functions as an evaporator for the primary-side refrigerant, the primary-side switching mechanism 72 enters a fifth connection state of connecting the suction side of the primary-side compressor 71 and a gas side of a primary-side flow path 35b of the cascade heat exchanger 35 (see solid lines in the primary-side switching mechanism 72 in FIG. 1). When the cascade heat exchanger 35 functions as a radiator for the primary-side refrigerant, the primary-side switching mechanism 72 enters a sixth connection state of connecting a discharge side of the primary-side compressor 71 and the gas side of the primary-side flow path 35b of the cascade heat exchanger 35 (see broken lines in the primary-side switching mechanism 72 in FIG. 1). In such a manner, the primary-side switching mechanism 72 is a device that can switch the flow path of the refrigerant in the primary-side refrigerant circuit 5a, and includes, for example, a four-way switching valve. Then, by changing a switching state of the primary-side switching mechanism 72, the cascade heat exchanger 35 can function as the evaporator or the radiator for the primary-side refrigerant.

The cascade heat exchanger 35 is a device for causing heat exchange between a refrigerant such as R32 which is a primary-side refrigerant and a refrigerant such as carbon dioxide which is a secondary-side refrigerant without mixing the refrigerants with each other. The cascade heat exchanger 35 is, for example, a plate-type heat exchanger. The cascade heat exchanger 35 includes a secondary-side flow path 35a belonging to the secondary-side refrigerant circuit 10 and the primary-side flow path 35b belonging to the primary-side refrigerant circuit 5a. The secondary-side flow path 35a has a gas side connected to a secondary-side switching mechanism 22 via a third pipe 25, and a liquid side connected to a cascade expansion valve 36 via a fourth pipe 26. The primary-side flow path 35b has a gas side connected to the primary-side compressor 71 via the first refrigerant pipe 113, the second gas shutoff valve 107, the primary-side second connection pipe 112, the first gas shutoff valve 109, and the primary-side switching mechanism 72, and has a liquid side connected to the second refrigerant pipe 114 provided with the primary-side second expansion valve 102.

The primary-side heat exchanger 74 is a device for exchanging heat between the primary-side refrigerant and outdoor air. The primary-side heat exchanger 74 has a gas side connected to a pipe extending from the primary-side switching mechanism 72. Examples of the primary-side heat exchanger 74 include a fin-and-tube heat exchanger including a large number of heat transfer tubes and fins.

The primary-side first expansion valve 76 is provided on a liquid pipe extending from a liquid side of the primary-side heat exchanger 74 to the primary-side subcooling heat exchanger 103. The primary-side first expansion valve 76 is an electrically powered expansion valve that has an adjustable opening degree for adjusting a flow rate of the primary-side refrigerant flowing in a portion on a liquid side of the primary-side refrigerant circuit 5a.

The primary-side subcooling circuit 104 branches from a portion between the primary-side first expansion valve 76 and the primary-side subcooling heat exchanger 103, and is connected to a portion between the primary-side switching mechanism 72 and the primary-side accumulator 105 on the suction flow path. The primary-side subcooling expansion valve 104a is an electrically powered expansion valve that is provided upstream of the primary-side subcooling heat exchanger 103 in the primary-side subcooling circuit 104 and has an adjustable opening degree for adjusting the flow rate of the primary-side refrigerant.

The primary-side subcooling heat exchanger 103 causes heat exchange between a refrigerant flowing from the primary-side first expansion valve 76 toward the first liquid shutoff valve 108 and a refrigerant decompressed at the primary-side subcooling expansion valve 104a in the primary-side subcooling circuit 104.

The primary-side first connection pipe 111 is a pipe connecting the first liquid shutoff valve 108 and the second liquid shutoff valve 106, and connects the primary-side unit 5 and the cascade unit 2.

The primary-side second connection pipe 112 is a pipe connecting the first gas shutoff valve 109 and the second gas shutoff valve 107, and connects the primary-side unit 5 and the cascade unit 2.

The second refrigerant pipe 114 is a pipe extending from a liquid side of the primary-side flow path 35b of the cascade heat exchanger 35 to the second liquid shutoff valve 106.

The primary-side second expansion valve 102 is provided on the second refrigerant pipe 114. The primary-side second expansion valve 102 is an electric expansion valve that has an adjustable opening degree for adjusting a flow rate of the primary-side refrigerant flowing in the primary-side flow path 35b of the cascade heat exchanger 35.

The first refrigerant pipe 113 is a pipe extending from the gas side of the primary-side flow path 35b of the cascade heat exchanger 35 to the second gas shutoff valve 107.

The first gas shutoff valve 109 is provided between the primary-side second connection pipe 112 and the primary-side switching mechanism 72.

(3) Secondary-Side Refrigerant Circuit

The secondary-side refrigerant circuit 10 includes the plurality of utilization units 3a, 3b, and 3c, the plurality of branch units 6a, 6b, and 6c, and the cascade unit 2, which are connected to each other. Each of the utilization units 3a, 3b, and 3c is connected to a corresponding one of the branch units 6a, 6b, and 6c one by one. Specifically, the utilization unit 3a and the branch unit 6a are connected via the first connecting tube 15a and the second connecting tube 16a, the utilization unit 3b and the branch unit 6b are connected via the first connecting tube 15b and the second connecting tube 16b, and the utilization unit 3c and the branch unit 6c are connected via the first connecting tube 15c and the second connecting tube 16c. Each of the branch units 6a, 6b, and 6c are connected to the cascade unit 2 via three connection pipes, namely, the secondary-side third connection pipe 7, the secondary-side first connection pipe 8, and the secondary-side second connection pipe 9. Specifically, the secondary-side third connection pipe 7, the secondary-side first connection pipe 8, and the secondary-side second connection pipe 9 extending from the cascade unit 2 are each branched into a plurality of pipes connected to the branch units 6a, 6b, and 6c.

In accordance with an operating state, either the refrigerant in a gas-liquid two-phase state or the refrigerant in a gas state flows in the secondary-side first connection pipe 8. Note that, in accordance with the operating state, the refrigerant in a supercritical state flows in the secondary-side first connection pipe 8. In accordance with the operating state, either the refrigerant in the gas-liquid two-phase state or the refrigerant in the gas state flows in the secondary-side second connection pipe 9. In accordance with the operating state, either the refrigerant in the gas-liquid two-phase state or the refrigerant in a liquid state flows in the secondary-side third connection pipe 7. Note that, in accordance with the operating state, the refrigerant in a supercritical state flows in the secondary-side third connection pipe 7.

The secondary-side refrigerant circuit 10 includes a cascade circuit 12, branch circuits 14a, 14b, and 14c, and utilization circuits 13a, 13b, and 13c, which are connected to each other.

The cascade circuit 12 principally includes a secondary-side compressor 21 (corresponding to a compressor), the secondary-side switching mechanism 22, a first pipe 28, a second pipe 29, a suction flow path 23, a discharge flow path 24, the third pipe 25, the fourth pipe 26, a fifth pipe 27, the cascade heat exchanger 35, the cascade expansion valve 36, a third shutoff valve 31, a first shutoff valve 32, a second shutoff valve 33, a secondary-side accumulator 30, an oil separator 34, an oil return circuit 40, a secondary-side receiver 45, a bypass circuit 46, a bypass expansion valve 46a, a secondary-side subcooling heat exchanger 47, a secondary-side subcooling circuit 48, and a secondary-side subcooling expansion valve 48a. The cascade circuit 12 of the secondary-side refrigerant circuit 10 specifically includes the secondary-side flow path 35a of the cascade heat exchanger 35.

The secondary-side compressor 21 is a device for compressing the secondary-side refrigerant, and is exemplarily constituted by a scroll type or other positive-displacement compressor whose operating capacity can be varied by controlling an inverter for a compressor motor 21a. The secondary-side compressor 21 is controlled in accordance with an operating load so as to have larger operating capacity as the load increases.

The secondary-side switching mechanism 22 is a mechanism that can switch a connection state of the secondary-side refrigerant circuit 10, specifically, the flow path of the refrigerant in the cascade circuit 12. In the present embodiment, the secondary-side switching mechanism 22 includes a discharge-side connection portion 22x, a suction-side connection portion 22y, a first switching valve 22a, and a second switching valve 22b. An end of the discharge flow path 24 on a side opposite to the secondary-side compressor 21 is connected to the discharge-side connection portion 22x. An end of the suction flow path 23 on a side opposite to the secondary-side compressor 21 is connected to the suction-side connection portion 22y. The first switching valve 22a and the second switching valve 22b are provided in parallel to each other between the discharge flow path 24 and the suction flow path 23 of the secondary-side compressor 21. The first switching valve 22a is connected to one end of the discharge-side connection portion 22x and one end of the suction-side connection portion 22y. The second switching valve 22b is connected to the other end of the discharge-side connection portion 22x and the other end of the suction-side connection portion 22y. In the present embodiment, each of the first switching valve 22a and the second switching valve 22b includes a four-way switching valve. Each of the first switching valve 22a and the second switching valve 22b has four connection ports, namely, a first connection port, a second connection port, a third connection port, and a fourth connection port. In the first switching valve 22a and the second switching valve 22b according to the present embodiment, each of the fourth ports is a closed connection port not connected to the flow path of the secondary-side refrigerant circuit 10. In the first switching valve 22a, the first connection port is connected to the one end of the discharge-side connection portion 22x, the second connection port is connected to the third pipe 25 extending from the secondary-side flow path 35a of the cascade heat exchanger 35, and the third connection port is connected to the one end of the suction-side connection portion 22y. The first switching valve 22a switches between a switching state in which the first connection port and the second connection port are connected and the third connection port and the fourth connection port are connected and a switching state in which the third connection port and the second connection port are connected and the first connection port and the fourth connection port are connected. The second switching valve 22b has the first connection port connected to the other end of the discharge-side connection portion 22x, the second connection port connected to the first pipe 28, and the third connection port connected to the other end of the suction-side connection portion 22y. The second switching valve 22b switches between a switching state in which the first connection port and the second connection port are connected and the third connection port and the fourth connection port are connected and a switching state in which the third connection port and the second connection port are connected and the first connection port and the fourth connection port are connected.

When the secondary-side refrigerant discharged from the secondary-side compressor 21 is prevented from being sent to the secondary-side first connection pipe 8 while the cascade heat exchanger 35 functions as a radiator for the secondary-side refrigerant, the secondary-side switching mechanism 22 is switched to a first connection state in which the discharge flow path 24 and the third pipe 25 are connected by the first switching valve 22a and the first pipe 28 and the suction flow path 23 are connected by the second switching valve 22b. The first connection state of the secondary-side switching mechanism 22 is a connection state adopted during the cooling operation described later. When the cascade heat exchanger 35 functions as an evaporator for the secondary-side refrigerant, the secondary-side switching mechanism 22 is switched to a second connection state in which the discharge flow path 24 and the first pipe 28 are connected by the second switching valve 22b and the third pipe 25 and the suction flow path 23 are connected by the first switching valve 22a. The second connection state of the secondary-side switching mechanism 22 is a connection state adopted during the heating operation and during the heating main operation described later. When the secondary-side refrigerant discharged from the secondary-side compressor 21 is sent to the secondary-side first connection pipe 8 while the cascade heat exchanger 35 functions as a radiator for the secondary-side refrigerant, the secondary-side switching mechanism 22 is switched to a third connection state in which the discharge flow path 24 and the third pipe 25 are connected by the first switching valve 22a and the discharge flow path 24 and the first pipe 28 are connected by the second switching valve 22b. The third connection state of the secondary-side switching mechanism 22 is a connection state adopted during the cooling main operation described later.

Figure 7:
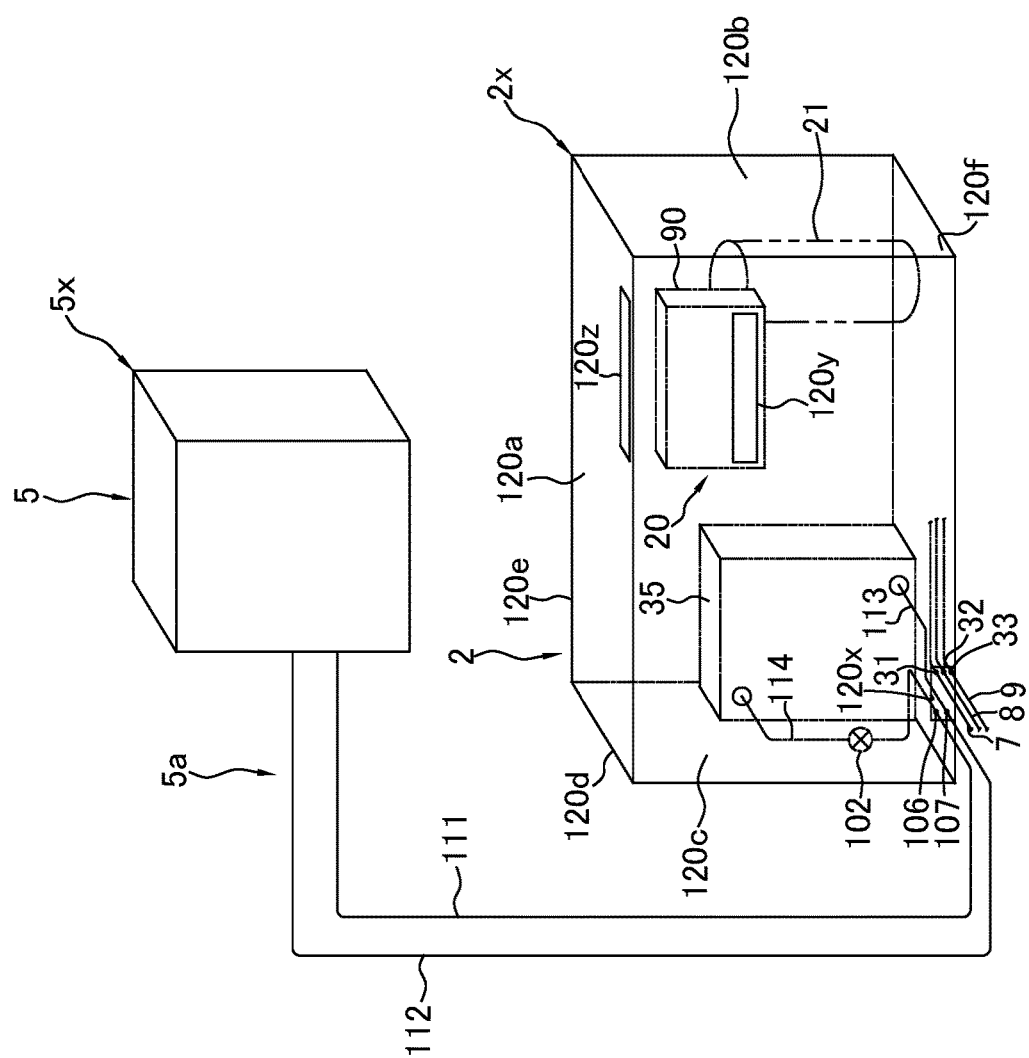
FIG. 7 is a schematic diagram illustrating connection between a primary-side unit and a cascade unit.

As described above, the cascade heat exchanger 35 is a device for causing heat exchange between the refrigerant such as R32 which is the primary-side refrigerant and the refrigerant such as carbon dioxide which is the secondary-side refrigerant without mixing the refrigerants with each other. The cascade heat exchanger 35 includes the secondary-side flow path 35a in which the secondary-side refrigerant in the secondary-side refrigerant circuit 10 flows and the primary-side flow path 35b in which the primary-side refrigerant in the primary-side refrigerant circuit 5a flows, so as to be shared between the primary-side unit 5 and the cascade unit 2. Note that, in the present embodiment, as illustrated in FIG. 7, the cascade heat exchanger 35 is disposed inside a cascade casing 2x of the cascade unit 2. The gas side of the primary-side flow path 35b of the cascade heat exchanger 35 extends to the primary-side second connection pipe 112 outside the cascade casing 2x via the first refrigerant pipe 113 and the second gas shutoff valve 107. The liquid side of the primary-side flow path 35b of the cascade heat exchanger 35 extends to the primary-side first connection pipe 111 outside the cascade casing 2x via the second refrigerant pipe 114 provided with the primary-side second expansion valve 102 and the second liquid shutoff valve 106.

The cascade expansion valve 36 is an expansion valve for adjusting a flow rate of the secondary-side refrigerant flowing in the cascade heat exchanger 35. The cascade expansion valve 36 is an electric expansion valve that is connected to a liquid side of the cascade heat exchanger 35 and has an adjustable opening degree. The cascade expansion valve 36 is provided on the fourth pipe 26.

Each of the third shutoff valve 31, the first shutoff valve 32, and the second shutoff valve 33 is provided at a connecting port with an external device or pipe (specifically, the connection pipe 7, 8, or 9). Specifically, the third shutoff valve 31 is connected to the secondary-side third connection pipe 7 led out of the cascade unit 2. The first shutoff valve 32 is connected to the secondary-side first connection pipe 8 led out of the cascade unit 2. The second shutoff valve 33 is connected to the secondary-side second connection pipe 9 led out of the cascade unit 2.

The first pipe 28 is a refrigerant pipe connecting the first shutoff valve 32 and the secondary-side switching mechanism 22. Specifically, the first pipe 28 connects the first shutoff valve 32 and the second connection port of the second switching valve 22b of the secondary-side switching mechanism 22.

The suction flow path 23 connects the secondary-side switching mechanism 22 and a suction side of the secondary-side compressor 21. Specifically, the suction flow path 23 connects the suction-side connection portion 22y of the secondary-side switching mechanism 22 and the suction side of the secondary-side compressor 21. The secondary-side accumulator 30 is provided at a halfway portion of the suction flow path 23.

The second pipe 29 is a refrigerant pipe that connects the second shutoff valve 33 to a halfway portion of the suction flow path 23. In the present embodiment, the second pipe 29 is connected to the suction flow path 23 at a connection point of the suction flow path 23 between the suction-side connection portion 22y of the secondary-side switching mechanism 22 and the secondary-side accumulator 30.

The discharge flow path 24 is a refrigerant pipe connecting a discharge side of the secondary-side compressor 21 and the secondary-side switching mechanism 22. Specifically, the discharge flow path 24 connects the discharge side of the secondary-side compressor 21 and the discharge-side connection portion 22x of the secondary-side switching mechanism 22.

The third pipe 25 is a refrigerant pipe connecting the secondary-side switching mechanism 22 and a gas side of the cascade heat exchanger 35. Specifically, the third pipe 25 connects the second connection port of the first switching valve 22a of the secondary-side switching mechanism 22 and a gas-side end of the secondary-side flow path 35a in the cascade heat exchanger 35.

The fourth pipe 26 is a refrigerant pipe connecting the liquid side (opposite to the gas side, and opposite to the side provided with the secondary-side switching mechanism 22) of the cascade heat exchanger 35 and the secondary-side receiver 45. Specifically, the fourth pipe 26 connects a liquid side end (opposite to the gas side) of the secondary-side flow path 35a in the cascade heat exchanger 35 and the secondary-side receiver 45.

The secondary-side receiver 45 is a refrigerant vessel that reserves a residue refrigerant in the secondary-side refrigerant circuit 10. Extended from the secondary-side receiver 45 are the fourth pipe 26, the fifth pipe 27, and the bypass circuit 46.

The bypass circuit 46 is a refrigerant pipe connecting a gas phase region which is an upper region in the secondary-side receiver 45 and the suction flow path 23. Specifically, the bypass circuit 46 is connected between the secondary-side switching mechanism 22 and the secondary-side accumulator 30 on the suction flow path 23. The bypass circuit 46 is provided with the bypass expansion valve 46a. The bypass expansion valve 46a is an electrically powered expansion valve that can adjust a quantity of the refrigerant guided from inside the secondary-side receiver 45 to the suction side of the secondary-side compressor 21 by adjusting an opening degree.

The fifth pipe 27 is a refrigerant pipe connecting the secondary-side receiver 45 and the third shutoff valve 31.

The secondary-side subcooling circuit 48 is a refrigerant pipe connecting a part of the fifth pipe 27 and the suction flow path 23. Specifically, the secondary-side subcooling circuit 48 is connected between the secondary-side switching mechanism 22 and the secondary-side accumulator 30 on the suction flow path 23. In the present embodiment, the secondary-side subcooling circuit 48 extends to branch from a portion between the secondary-side receiver 45 and the secondary-side subcooling heat exchanger 47.

The secondary-side subcooling heat exchanger 47 is a heat exchanger that causes heat exchange between the refrigerant flowing in a flow path belonging to the fifth pipe 27 and the refrigerant flowing in a flow path belonging to the secondary-side subcooling circuit 48. In the present embodiment, the secondary-side subcooling heat exchanger 47 is provided between a portion from where the secondary-side subcooling circuit 48 branches and the third shutoff valve 31 on the fifth pipe 27. The secondary-side subcooling expansion valve 48a is provided between a portion branching from the fifth pipe 27 and the secondary-side subcooling heat exchanger 47 on the secondary-side subcooling circuit 48. The secondary-side subcooling expansion valve 48a is an electrically powered expansion valve that has an adjustable opening degree and supplies the secondary-side subcooling heat exchanger 47 with a decompressed refrigerant.

The secondary-side accumulator 30 is a vessel that can reserve the secondary-side refrigerant, and is provided on the suction side of the secondary-side compressor 21.

The oil separator 34 is provided at a halfway portion of the discharge flow path 24. The oil separator 34 is a device for separating refrigerating machine oil discharged from the secondary-side compressor 21 along with the secondary-side refrigerant from the secondary-side refrigerant and return the refrigerating machine oil to the secondary-side compressor 21.

The oil return circuit 40 is provided to connect the oil separator 34 and the suction flow path 23. The oil return circuit 40 includes an oil return flow path 41 which is a flow path extending from the oil separator 34 and extending to join a portion between the secondary-side accumulator 30 and the suction side of the secondary-side compressor 21 on the suction flow path 23. An oil return capillary tube 42 and an oil return on-off valve 44 are provided at a halfway portion of the oil return flow path 41. When the oil return on-off valve 44 is controlled into an opened state, the refrigerating machine oil separated in the oil separator 34 passes through the oil return capillary tube 42 on the oil return flow path 41 and is returned to the suction side of the secondary-side compressor 21. In the present embodiment, when the secondary-side compressor 21 is in an operating state on the secondary-side refrigerant circuit 10, the oil return on-off valve 44 is kept in the opened state for predetermined time and is kept in a closed state for predetermined time repetitively, to control a returned quantity of the refrigerating machine oil through the oil return circuit 40. In the present embodiment, the oil return on-off valve 44 is an electromagnetic valve controlled to be opened and closed. Alternatively, the oil return on-off valve 44 may be an electrically powered expansion valve having an adjustable opening degree and not provided with the oil return capillary tube 42.

Hereinafter, the utilization circuits 13a, 13b, and 13c will be described. Since the utilization circuits 13b and 13c are configured similarly to the utilization circuit 13a, elements of the utilization circuits 13b and 13c will not be described repeatedly, assuming that a subscript "b" or "c" will replace a subscript "a" in reference signs denoting elements of the utilization circuit 13a.

The utilization circuit 13a principally includes a utilization-side heat exchanger 52a, a first utilization pipe 57a, a second utilization pipe 56a, and a utilization-side expansion valve 51a.

The utilization-side heat exchanger 52a is a device for causing heat exchange between a refrigerant and indoor air, and includes, for example, a fin-and-tube heat exchanger including a large number of heat transfer tubes and fins. The plurality of utilization-side heat exchangers 52a, 52b, and 52c are connected in parallel to the secondary-side switching mechanism 22, the suction flow path 23, and the cascade heat exchanger 35.

The second utilization pipe 56a has one end connected to a liquid side (opposite to a gas side) of the utilization-side heat exchanger 52a in the first utilization unit 3a. The other end of the second utilization pipe 56a is connected to the second connecting tube 16a. The utilization-side expansion valve 51a described above is provided at a halfway portion of the second utilization pipe 56a.

The utilization-side expansion valve 51a is an electrically powered expansion valve that has an adjustable opening degree for adjusting a flow rate of the refrigerant flowing in the utilization-side heat exchanger 52a. The utilization-side expansion valve 51a is provided on the second utilization pipe 56a.

The first utilization pipe 57a has one end connected to the gas side of the utilization-side heat exchanger 52a in the first utilization unit 3a. In the present embodiment, the first utilization pipe 57a is connected to a portion opposite to the utilization-side expansion valve 51a of the utilization-side heat exchanger 52a. The first utilization pipe 57a has the other end connected to the first connecting tube 15a.

Hereinafter, the branch circuits 14a, 14b, and 14c will be described. Since the branch circuits 14b and 14c are configured similarly to the branch circuit 14a, elements of the branch circuits 14b and 14c will not be described repeatedly, assuming that a subscript "b" or "c" will replace a subscript "a" in reference signs denoting elements of the branch circuit 14a.

The branch circuit 14a mainly includes a junction pipe 62a, a first branch pipe 63a, a second branch pipe 64a, a first regulating valve 66a, a second regulating valve 67a, a bypass pipe 69a, a check valve 68a, and a third branch pipe 61a.

The junction pipe 62a has one end connected to the first connecting tube 15a. The junction pipe 62a has the other end branched to be connected with the first branch pipe 63a and the second branch pipe 64a.

The first branch pipe 63a has a portion opposite to the junction pipe 62 and connected to the secondary-side first connection pipe 8. The first branch pipe 63a is provided with the openable and closable first regulating valve 66a.

The second branch pipe 64a has a portion opposite to the junction pipe 62 and connected to the secondary-side second connection pipe 9. The second branch pipe 64a is provided with the openable and closable second regulating valve 67a.

The bypass pipe 69a is a refrigerant pipe that connects a portion of the first branch pipe 63a closer to the secondary-side first connection pipe 8 than the first regulating valve 66a and a portion of the second branch pipe 64a closer to the secondary-side second connection pipe 9 than the second regulating valve 67a. The check valve 68a is provided at a halfway portion of the bypass pipe 69a. The check valve 68a allows only a refrigerant flow from the second branch pipe 64a toward the first branch pipe 63a, and does not allow a refrigerant flow from the first branch pipe 63a toward the second branch pipe 64a.

The third branch pipe 61a has one end connected to the second connecting tube 16a. The other end of the third branch pipe 61a is connected to the secondary-side third connection pipe 7.

The first branch unit 6a can function as follows by closing the first regulating valve 66a and opening the second regulating valve 67a when the cooling operation described later is performed. The first branch unit 6a sends a refrigerant flowing into the third branch pipe 61a through the secondary-side third connection pipe 7 to the second connecting tube 16a. The refrigerant flowing in the second utilization pipe 56a in the first utilization unit 3a through the second connecting tube 16a is sent to the utilization-side heat exchanger 52a in the first utilization unit 3a through the utilization-side expansion valve 51a. The refrigerant sent to the utilization-side heat exchanger 52a is evaporated by heat exchange with indoor air, and then flows in the first connecting tube 15a via the first utilization pipe 57a. The refrigerant having flowed through the first connecting tube 15a is sent to the junction pipe 62a of the first branch unit 6a. The refrigerant having flowed through the junction pipe 62a does not flow toward the first branch pipe 63a but flows toward the second branch pipe 64a. The refrigerant flowing in the second branch pipe 64a passes through the second regulating valve 67a. A part of the refrigerant that has passed through the second regulating valve 67a is sent to the secondary-side second connection pipe 9. The remaining part of the refrigerant that has passed through the second regulating valve 67a flows so as to branch into the bypass pipe 69a provided with the check valve 68a, passes through a part of the first branch pipe 63a, and then is sent to the secondary-side first connection pipe 8. As a result, it is possible to increase a total flow path sectional area when the secondary-side refrigerant in a gas state evaporated in the utilization-side heat exchanger 52a is sent to the secondary-side compressor 21, so that pressure loss can be reduced.

When the first utilization unit 3a cools an indoor space at the time of performing the cooling main operation and the heating main operation described later, the first branch unit 6a can function as follows by closing the first regulating valve 66a and opening the second regulating valve 67a. The first branch unit 6a sends a refrigerant flowing into the third branch pipe 61a through the secondary-side third connection pipe 7 to the second connecting tube 16a. The refrigerant flowing in the second utilization pipe 56a in the first utilization unit 3a through the second connecting tube 16a is sent to the utilization-side heat exchanger 52a in the first utilization unit 3a through the utilization-side expansion valve 51a. The refrigerant sent to the utilization-side heat exchanger 52a is evaporated by heat exchange with indoor air, and then flows in the first connecting tube 15a via the first utilization pipe 57a. The refrigerant having flowed through the first connecting tube 15a is sent to the junction pipe 62a of the first branch unit 6a. The refrigerant having flowed through the junction pipe 62a flows to the second branch pipe 64a, passes through the second regulating valve 67a, and then is sent to the secondary-side second connection pipe 9.

The first branch unit 6a can function as follows by closing the second regulating valve 67a and opening the first regulating valve 66a when the heating operation described later is performed. In the first branch unit 6a, the refrigerant flowing into the first branch pipe 63a through the secondary-side first connection pipe 8 passes through the first regulating valve 66a and is sent to the junction pipe 62a. The refrigerant having flowed through the junction pipe 62a flows in the first utilization pipe 57a in the utilization unit 3a via the first connecting tube 15a and is sent to the utilization-side heat exchanger 52a. The refrigerant sent to the utilization-side heat exchanger 52a radiates heat through heat exchange with indoor air, and then passes through the utilization-side expansion valve 51a provided on the second utilization pipe 56a. The refrigerant having passed through the second utilization pipe 56a flows through the third branch pipe 61a of the first branch unit 6a via the second connecting tube 16a, and then is sent to the secondary-side third connection pipe 7.

When the first utilization unit 3a heats an indoor space at the time of performing the cooling main operation and the heating main operation described later, the first branch unit 6a can function as follows by closing the second regulating valve 67a and opening the first regulating valve 66a. In the first branch unit 6a, the refrigerant flowing into the first branch pipe 63a through the secondary-side first connection pipe 8 passes through the first regulating valve 66a and is sent to the junction pipe 62a. The refrigerant having flowed through the junction pipe 62a flows in the first utilization pipe 57a in the utilization unit 3a via the first connecting tube 15a and is sent to the utilization-side heat exchanger 52a. The refrigerant sent to the utilization-side heat exchanger 52a radiates heat through heat exchange with indoor air, and then passes through the utilization-side expansion valve 51a provided on the second utilization pipe 56a. The refrigerant having passed through the second utilization pipe 56a flows through the third branch pipe 61a of the first branch unit 6a via the second connecting tube 16a, and then is sent to the secondary-side third connection pipe 7.

The first branch unit 6a, as well as the second branch unit 6b and the third branch unit 6c, similarly have such a function. Accordingly, the first branch unit 6a, the second branch unit 6b, and the third branch unit 6c can individually switchably cause the utilization-side heat exchangers 52a, 52b, and 52c to function as a refrigerant evaporator or a refrigerant radiator.

(4) Primary-Side Unit

The primary-side unit 5 is disposed in a space different from a space provided with the utilization units 3a, 3b, and 3c and the branch units 6a, 6b, and 6c, on a roof, or the like.

The primary-side unit 5 includes a part of the above-described primary-side refrigerant circuit 5a, a primary-side fan 75, various sensors, a primary-side control unit 70, and a primary-side casing 5x as illustrated in FIG. 7.

The primary-side unit 5 includes, as a part of the primary-side refrigerant circuit 5a, the primary-side compressor 71, the primary-side switching mechanism 72, the primary-side heat exchanger 74, the primary-side first expansion valve 76, the primary-side subcooling heat exchanger 103, the primary-side subcooling circuit 104, the primary-side subcooling expansion valve 104a, the first liquid shutoff valve 108, the first gas shutoff valve 109, and the primary-side accumulator 105 in the primary-side casing 5x.

The primary-side fan 75 is provided in the primary-side unit 5, and generates an air flow of guiding outdoor air into the primary-side heat exchanger 74, and exhausting, to outdoors, air obtained after heat exchange with the primary-side refrigerant flowing in the primary-side heat exchanger 74. The primary-side fan 75 is driven by a primary-side fan motor 75a.

The primary-side unit 5 is provided with the various sensors. Specifically, there are provided an outdoor air temperature sensor 77 that detects a temperature of outdoor air before passing through the primary-side heat exchanger 74, a primary-side discharge pressure sensor 78 that detects a pressure of the primary-side refrigerant discharged from the primary-side compressor 71, a primary-side suction pressure sensor 79 that detects a pressure of the primary-side refrigerant sucked into the primary-side compressor 71, a primary-side suction temperature sensor 81 that detects a temperature of the primary-side refrigerant sucked into the primary-side compressor 71, and a primary-side heat exchange temperature sensor 82 that detects a temperature of the refrigerant flowing in the primary-side heat exchanger 74.

The primary-side control unit 70 controls motion of the elements 71 (71a), 72, 75 (75a), 76, and 104a provided in the primary-side unit 5. The primary-side control unit 70 includes a processor such as a CPU or a microcomputer provided to control the primary-side unit 5 and a memory, so as to transmit and receive control signals and the like to and from a remote controller (not illustrated), and to transmit and receive control signals and the like between a cascade-side control unit 20 in a cascade unit 2, branch unit control units 60a, 60b, and 60c, and utilization-side control units 50a, 50b, and 50c.

(5) Cascade Unit

The cascade unit 2 is disposed in a space different from a space provided with the utilization units 3a, 3b, and 3c and the branch units 6a, 6b, and 6c, on a roof, or the like.

The cascade unit 2 is connected to the branch units 6a, 6b, and 6c via the connection pipes 7, 8, and 9, to constitute a part of the secondary-side refrigerant circuit 10. The cascade unit 2 is connected to the primary-side unit 5 via the primary-side first connection pipe 111 and the primary-side second connection pipe 112, to constitute a part of the primary-side refrigerant circuit 5a.

The cascade unit 2 mainly includes the cascade circuit 12 described above, various sensors, the cascade-side control unit 20, the second liquid shutoff valve 106, the second refrigerant pipe 114, the primary-side second expansion valve 102, the first refrigerant pipe 113, and the second gas shutoff valve 107 that constitute a part of the primary-side refrigerant circuit 5a, and the cascade casing 2x as illustrated in FIG. 7.

The cascade unit 2 is provided with a secondary-side suction pressure sensor 37 that detects a pressure of the secondary-side refrigerant on the suction side of the secondary-side compressor 21, a secondary-side discharge pressure sensor 38 that detects a pressure of the secondary-side refrigerant on the discharge side of the secondary-side compressor 21, a secondary-side discharge temperature sensor 39 that detects a temperature of the secondary-side refrigerant on the discharge side of the secondary-side compressor 21, a secondary-side suction temperature sensor 88 that detects a temperature of the secondary-side refrigerant on the suction side of the secondary-side compressor 21, a secondary-side cascade temperature sensor 83 that detects a temperature of the secondary-side refrigerant flowing between the secondary-side flow path 35a of the cascade heat exchanger 35 and the cascade expansion valve 36, a receiver outlet temperature sensor 84 that detects a temperature of the secondary-side refrigerant flowing between the secondary-side receiver 45 and the secondary-side subcooling heat exchanger 47, a bypass circuit temperature sensor 85 that detects a temperature of the secondary-side refrigerant flowing downstream of the bypass expansion valve 46a in the bypass circuit 46, a subcooling outlet temperature sensor 86 that detects a temperature of the secondary-side refrigerant flowing between the secondary-side subcooling heat exchanger 47 and the third shutoff valve 31, and a subcooling circuit temperature sensor 87 that detects a temperature of the secondary-side refrigerant flowing at an outlet of the secondary-side subcooling heat exchanger 47 in the secondary-side subcooling circuit 48.

The cascade-side control unit 20 controls motion of the elements 21 (21a), 22, 36, 44, 46a, 48a, and 102 provided in the cascade casing 2x of the cascade unit 2. The cascade-side control unit 20 includes a processor such as a CPU or a microcomputer provided to control the cascade unit 2 and a memory, so as to transmit and receive control signals and the like between the primary-side control unit 70 in the primary-side unit 5, the utilization-side control units 50a, 50b, and 50c in the utilization units 3a, 3b, and 3c, and the branch unit control units 60a, 60b, and 60c.

In such a manner, the cascade-side control unit 20 can control not only the elements constituting the cascade circuit 12 of the secondary-side refrigerant circuit 10 but also the primary-side second expansion valve 102 constituting a part of the primary-side refrigerant circuit 5a. Therefore, the cascade-side control unit 20 controls a valve opening degree of the primary-side second expansion valve 102 on the basis of a condition of the cascade circuit 12 controlled by the cascade-side control unit 20, so as to bring the condition of the cascade circuit 12 closer to a desired condition. Specifically, it is possible to control an amount of heat received by the secondary-side refrigerant flowing in the secondary-side flow path 35a of the cascade heat exchanger 35 in the cascade circuit 12 from the primary-side refrigerant flowing in the primary-side flow path 35b of the cascade heat exchanger 35 or an amount of heat given by the secondary-side refrigerant to the primary-side refrigerant.

(6) Utilization Unit

The utilization units 3a, 3b, and 3c are installed by being embedded in or being suspended from a ceiling on an indoor space of a building or the like, or by being hung on a wall surface in the indoor space, or the like.

The utilization units 3a, 3b, and 3c are connected to the cascade unit 2 via the connection pipes 7, 8, and 9.

The utilization units 3a, 3b, and 3c respectively include the utilization circuits 13a, 13b, and 13c constituting a part of the secondary-side refrigerant circuit 10.

Hereinafter, the utilization units 3a, 3b, and 3c will be described in terms of their configurations. The second utilization unit 3b and the third utilization unit 3c are configured similarly to the first utilization unit 3a. The configuration of only the first utilization unit 3a will thus be described here. As for the configuration of each of the second utilization unit 3b and the third utilization unit 3c, elements will be denoted by reference signs obtained by replacing a subscript "a" in reference signs of elements of the first utilization unit 3a with a subscript "b" or "c", and these elements will not be described repeatedly.

The first utilization unit 3a mainly includes the utilization circuit 13a described above, an indoor fan 53a, the utilization-side control unit 50a, and various sensors. Note that the indoor fan 53a includes an indoor fan motor 54a.

The indoor fan 53a generates an air flow by sucking indoor air into the unit and supplying the indoor space with supply air obtained after heat exchange with the refrigerant flowing in the utilization-side heat exchanger 52a. The indoor fan 53a is driven by the indoor fan motor 54a.

The utilization unit 3a is provided with a liquid-side temperature sensor 58a that detects a temperature of a refrigerant on the liquid side of the utilization-side heat exchanger 52a. The utilization unit 3a is further provided with an indoor temperature sensor 55a that detects an indoor temperature as temperature of air introduced from the indoor space before passing through the utilization-side heat exchanger 52a.

The utilization-side control unit 50a controls motion of the elements 51a and 53a (54a) constituting the utilization unit 3a. The utilization-side control unit 50a includes a processor such as a CPU or a microcomputer provided to control the utilization unit 3a and a memory, so as to transmit and receive control signals and the like to and from the remote controller (not illustrated), and to transmit and receive control signals and the like between the cascade-side control unit 20 in the cascade unit 2, the branch unit control units 60a, 60b, and 60c, and the primary-side control unit 70 in the primary-side unit 5.

Note that the second utilization unit 3b includes the utilization circuit 13b, an indoor fan 53b, the utilization-side control unit 50b, and an indoor fan motor 54b. The third utilization unit 3c includes the utilization circuit 13c, an indoor fan 53c, the utilization-side control unit 50c, and an indoor fan motor 54c.

(7) Branch Unit

The branch units 6a, 6b, and 6c are installed in a space above a ceiling of an indoor space of a building or the like.

Each of the branch units 6a, 6b, and 6c is connected to a corresponding one of the utilization units 3a, 3b, and 3c one by one. The branch units 6a, 6b, and 6c are connected to the cascade unit 2 via the connection pipes 7, 8, and 9.

Next, the branch units 6a, 6b, and 6c will be described next in terms of their configurations. The second branch unit 6b and the third branch unit 6c are configured similarly to the first branch unit 6a. The configuration of only the first branch unit 6a will thus be described here. As for the configuration of each of the second branch unit 6b and the third branch unit 6c, elements will be denoted by reference signs obtained by replacing a subscript "a" in reference signs of elements of the first branch unit 6a with a subscript "b" or "c", and these elements will not be described repeatedly.

The first branch unit 6a mainly includes the branch circuit 14a described above and the branch unit control unit 60a.

The branch unit control unit 60a controls motion of the elements 66a and 67a constituting the branch unit 6a. The branch unit control unit 60a includes a processor such as a CPU or a microcomputer provided to control the branch unit 6a and a memory, so as to transmit and receive control signals and the like to and from the remote controller (not depicted), and to transmit and receive control signals and the like between the cascade-side control unit 20 in the cascade unit 2, the utilization units 3a, 3b, and 3c, and the primary-side control unit 70 in the primary-side unit 5.

Note that the second branch unit 6b includes the branch circuit 14b and the branch unit control unit 60b. The third branch unit 6c includes the branch circuit 14c and the branch unit control unit 60c.

(8) Control Unit

In the refrigeration cycle apparatus 1, the heat cascade-side control unit 20, the utilization-side control units 50a, 50b, and 50c, the branch unit control units 60a, 60b, and 60c, and the primary-side control unit 70 described above are communicably connected to each other in a wired or wireless manner to constitute a control unit 80. Therefore, the control unit 80 controls motion of the elements 21(21a), 22, 36, 44, 46a, 48a, 51a, 51b, 51c, 53a, 53b, 53c (54a, 54b, 54c), 66a, 66b, 66c, 67a, 67b, 67c, 71 (71a), 72, 75 (75a), 76, 104a on the basis of detection information of various sensors 37, 38, 39, 83, 84, 85, 86, 87, 88, 77, 78, 79, 81, 82, 58a, 58b, 58c, and the like, and instruction information received from a remote controller (not illustrated) and the like.

(9) Motion of Refrigeration Cycle Apparatus

Next, motion of the refrigeration cycle apparatus 1 will be described with reference to FIGS. 3 to 6.

The refrigeration cycle operation of the refrigeration cycle apparatus 1 can be mainly divided into cooling operation, heating operation, cooling main operation, and heating main operation.

Here, the cooling operation is refrigeration cycle operation in which only the utilization unit in which the utilization-side heat exchanger functions as a refrigerant evaporator exists, and the cascade heat exchanger 35 functions as a radiator for the secondary-side refrigerant with respect to an evaporation load of the entire utilization unit.

Here, the heating operation is refrigeration cycle operation in which only the utilization unit in which the utilization-side heat exchanger functions as a refrigerant radiator exists, and the cascade heat exchanger 35 functions as an evaporator for the secondary-side refrigerant with respect to a radiation load of the entire utilization unit.

The cooling main operation is operation in which the utilization unit in which the utilization-side heat exchanger functions as a refrigerant evaporator and the utilization unit in which the utilization-side heat exchanger functions as a refrigerant radiator are mixed. The cooling main operation is refrigeration cycle operation in which, when an evaporation load is a main heat load of the entire utilization unit, the cascade heat exchanger 35 functions as a radiator for the secondary-side refrigerant in order to process the evaporation load of the entire utilization unit.

The heating main operation is operation in which the utilization unit in which the utilization-side heat exchanger functions as a refrigerant evaporator and the utilization unit in which the utilization-side heat exchanger functions as a refrigerant radiator are mixed. The heating main operation is refrigeration cycle operation in which, when a radiation load is a main heat load of the entire utilization unit, the cascade heat exchanger 35 functions as an evaporator for the secondary-side refrigerant in order to process the radiation load of the entire utilization unit.

Note that the motion of the refrigeration cycle apparatus 1 including the refrigeration cycle operation is performed by the control unit 80 described above.

(9-1) Cooling Operation

Figure 3:
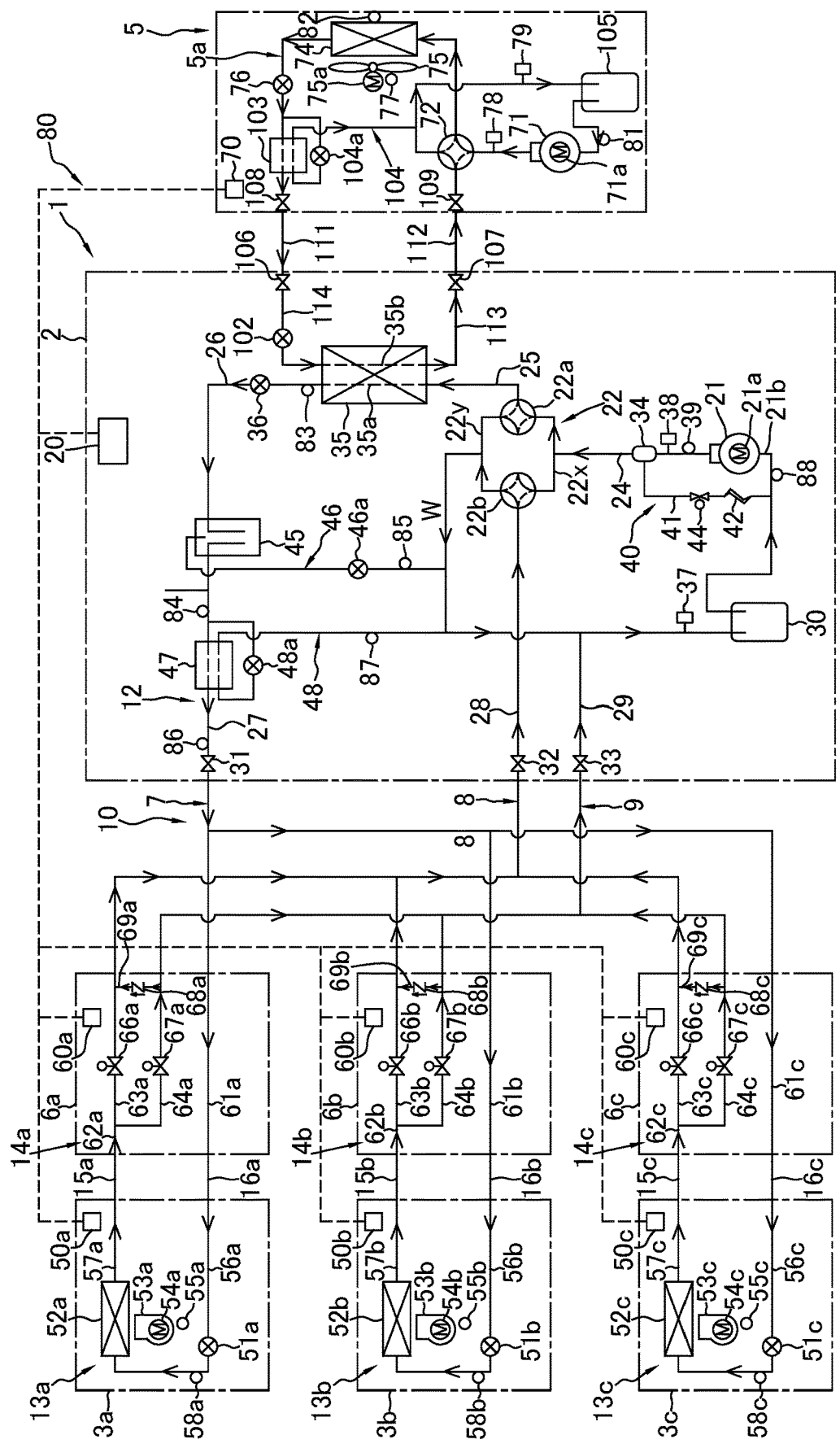
FIG. 3 is a diagram illustrating motion (a flow of a refrigerant) in cooling operation of the refrigeration cycle apparatus.

During the cooling operation, for example, each of the utilization-side heat exchangers 52a, 52b, and 52c in the utilization units 3a, 3b, and 3c functions as a refrigerant evaporator, and the cascade heat exchanger 35 functions as a radiator for the secondary-side refrigerant. In the cooling operation, the primary-side refrigerant circuit 5a and the secondary-side refrigerant circuit 10 of the refrigeration cycle apparatus 1 are configured as illustrated in FIG. 3. Note that arrows attached to the primary-side refrigerant circuit 5a and arrows attached to the secondary-side refrigerant circuit 10 in FIG. 3 indicate flows of the refrigerant during the cooling operation.

Specifically, in the primary-side unit 5, the primary-side switching mechanism 72 is switched to the fifth connection state to cause the cascade heat exchanger 35 to function as an evaporator for the primary-side refrigerant. The fifth connection state of the primary-side switching mechanism 72 is depicted by solid lines in the primary-side switching mechanism 72 in FIG. 3. Accordingly, in the primary-side unit 5, the primary-side refrigerant discharged from the primary-side compressor 71 passes through the primary-side switching mechanism 72 and exchanges heat with outdoor air supplied from the primary-side fan 75 in the primary-side heat exchanger 74 to be condensed. The primary-side refrigerant condensed in the primary-side heat exchanger 74 passes through the primary-side first expansion valve 76 controlled into a fully opened state, and a part of the refrigerant flows toward the first liquid shutoff valve 108 through the primary-side subcooling heat exchanger 103, and another part of the refrigerant branches into the primary-side subcooling circuit 104. The refrigerant flowing in the primary-side subcooling circuit 104 is decompressed when passing through the primary-side subcooling expansion valve 104a. The refrigerant flowing from the primary-side first expansion valve 76 toward the first liquid shutoff valve 108 exchanges heat with the refrigerant decompressed by the primary-side subcooling expansion valve 104a and flowing in the primary-side subcooling circuit 104 in the primary-side subcooling heat exchanger 103, and is cooled until reaching a subcooled state. The refrigerant in the subcooled state flows through the primary-side first connection pipe 111, the second liquid shutoff valve 106, and the second refrigerant pipe 114 in that order, and is decompressed when passing through the primary-side second expansion valve 102. Here, a valve opening degree of the primary-side second expansion valve 102 is controlled such that a degree of superheating of the primary-side refrigerant sucked into the primary-side compressor 71 satisfies a predetermined condition. When flowing in the primary-side flow path 35b of the cascade heat exchanger 35, the primary-side refrigerant decompressed by the primary-side second expansion valve 102 evaporates by exchanging heat with the secondary-side refrigerant in through the secondary-side flow path 35a, and flows toward the second gas shutoff valve 107 through the first refrigerant pipe 113. The refrigerant having passed through the second gas shutoff valve 107 passes through the primary-side second connection pipe 112 and the first gas shutoff valve 109, and then reaches the primary-side switching mechanism 72. The refrigerant having passed through the primary-side switching mechanism 72 joins the refrigerant having flowed through the primary-side subcooling circuit 104, and is then sucked into the primary-side compressor 71 via the primary-side accumulator 105.

In the cascade unit 2, by switching the secondary-side switching mechanism 22 to the first connection state, the cascade heat exchanger 35 functions as a radiator for the secondary-side refrigerant. In the first connection state of the secondary-side switching mechanism 22, the discharge flow path 24 and the third pipe 25 are connected by the first switching valve 22a, and the first pipe 28 and the suction flow path 23 are connected by the second switching valve 22b. In the first to third utilization units 3a, 3b, 3c, the second regulating valves 67a, 67b, 67c are controlled to the opened state. Accordingly, all of the utilization-side heat exchangers 52a, 52b, and 52c in the utilization units 3a, 3b, and 3c function as refrigerant evaporators. All of the utilization-side heat exchangers 52a, 52b, and 52c of the utilization units 3a, 3b, and 3c and the suction side of the secondary-side compressor 21 of the cascade unit 2 are connected via the first utilization pipes 57a, 57b, and 57c, the first connecting tubes 15a, 15b, and 15c, the junction pipes 62a, 62b, and 62c, the second branch pipes 64a, 64b, and 64c, the bypass pipes 69a, 69b, and 69c, a part of the first branch pipes 63a, 63b, and 63c, the secondary-side first connection pipe 8, and the secondary-side second connection pipe 9. In addition, an opening degree of the secondary-side subcooling expansion valve 48a is controlled such that a degree of subcooling of the secondary-side refrigerant flowing through the outlet of the secondary-side subcooling heat exchanger 47 toward the secondary-side third connection pipe 7 satisfies a predetermined condition. The bypass expansion valve 46a is controlled to the closed state. In the utilization units 3a, 3b, and 3c, the opening degrees of the utilization-side expansion valves 51a, 51b, and 51c are adjusted.

In the cooling operation, the secondary-side refrigerant circuit 10 controls capacity, for example, by controlling a frequency of the secondary-side compressor 21 so that evaporation temperature of the secondary-side refrigerant in the utilization-side heat exchangers 52a, 52b, and 52c becomes a predetermined secondary-side evaporation target temperature. The opening degree of the cascade expansion valve 36 is adjusted such that the secondary-side refrigerant flowing in the cascade heat exchanger 35 has a critical pressure or less. The primary-side refrigerant circuit 5a controls capacity, for example, by controlling a frequency of the primary-side compressor 71 such that evaporation temperature of the primary-side refrigerant in the primary-side flow path 35b of the cascade heat exchanger 35 becomes a predetermined primary-side evaporation target temperature. In such a manner, in the cooling operation, either or both of the control for increasing the valve opening degree of the cascade expansion valve 36 and the control for increasing the frequency of the primary-side compressor 71 in the primary-side refrigerant circuit 5a are executed, and thus, the carbon dioxide refrigerant flowing in the cascade heat exchanger 35 is controlled so as not to exceed a critical point.

In such a secondary-side refrigerant circuit 10, a high-pressure secondary-side refrigerant compressed and discharged by the secondary-side compressor 21 is sent to the secondary-side flow path 35a of the cascade heat exchanger 35 through the first switching valve 22a of the secondary-side switching mechanism 22. The secondary-side high-pressure refrigerant flowing in the secondary-side flow path 35a of the cascade heat exchanger 35 radiates heat, and the primary-side refrigerant flowing in the primary-side flow path 35b of the cascade heat exchanger 35 is evaporated. The secondary-side refrigerant having radiated heat in the cascade heat exchanger 35 passes through the cascade expansion valve 36 whose opening degree is adjusted, and then flows into the secondary-side receiver 45. A part of the refrigerant flowing out of the secondary-side receiver 45 branches and flows into the secondary-side subcooling circuit 48, is decompressed in the secondary-side subcooling expansion valve 48a, and then joins the suction flow path 23. In the secondary-side subcooling heat exchanger 47, another part of the refrigerant having flowed out of the secondary-side receiver 45 is cooled by the refrigerant flowing in the secondary-side subcooling circuit 48, and is then sent to the secondary-side third connection pipe 7 through the third shutoff valve 31.

Then, the refrigerant sent to the secondary-side third connection pipe 7 is branched into three portions to pass through the third branch pipes 61a, 61b, and 61c of the first to third branch units 6a, 6b, and 6c. Thereafter, the refrigerant having flowed through the second connecting tubes 16a, 16b, and 16c is sent to the second utilization pipes 56a, 56b, and 56c of the first to third utilization units 3a, 3b, and 3c. The refrigerant sent to the second utilization pipes 56a, 56b, and 56c is sent to the utilization-side expansion valves 51a, 51b, and 51c in the utilization units 3a, 3b, and 3c.

Then, the refrigerant having passed through the utilization-side expansion valves 51a, 51b, and 51c whose opening degrees are adjusted exchanges heat with indoor air supplied by the indoor fans 53a, 53b, and 53c in the utilization-side heat exchangers 52a, 52b, and 52c. The refrigerant flowing in the utilization-side heat exchangers 52a, 52b, and 52c is thus evaporated into a low-pressure gas refrigerant. The indoor air is cooled and is supplied into the indoor space. The indoor space is thus cooled. The low-pressure gas refrigerant evaporated in the utilization-side heat exchangers 52a, 52b, and 52c flows in the first utilization pipes 57a, 57b, and 57c, flows through the first connecting tubes 15a, 15b, and 15c, and then is sent to the junction pipes 62a, 62b, and 62c of the first to third branch units 6a, 6b, and 6c.

Then, the low-pressure gas refrigerant sent to the junction pipes 62a, 62b, and 62c flows to the second branch pipes 64a, 64b, and 64c. A part of the refrigerant that has passed through the second regulating valves 67a, 67b, and 67c in the second branch pipes 64a, 64b, and 64c is sent to the secondary-side second connection pipe 9. The remaining part of the refrigerant that has passed through the second regulating valves 67a, 67b, and 67c passes through the bypass pipes 69a, 69b, and 69c, flows through a part of the first branch pipes 63a, 63b, and 63c, and then is sent to the secondary-side first connection pipe 8.

Then, the low-pressure gas refrigerant sent to the secondary-side first connection pipe 8 and the secondary-side second connection pipe 9 is returned to the suction side of the secondary-side compressor 21 through the first shutoff valve 32, the second shutoff valve 33, the first pipe 28, the second pipe 29, the second switching valve 22b of the secondary-side switching mechanism 22, the suction flow path 23, and the secondary-side accumulator 30.

Motion during the cooling operation is performed in such a manner.

(9-2) Heating Operation

Figure 4:
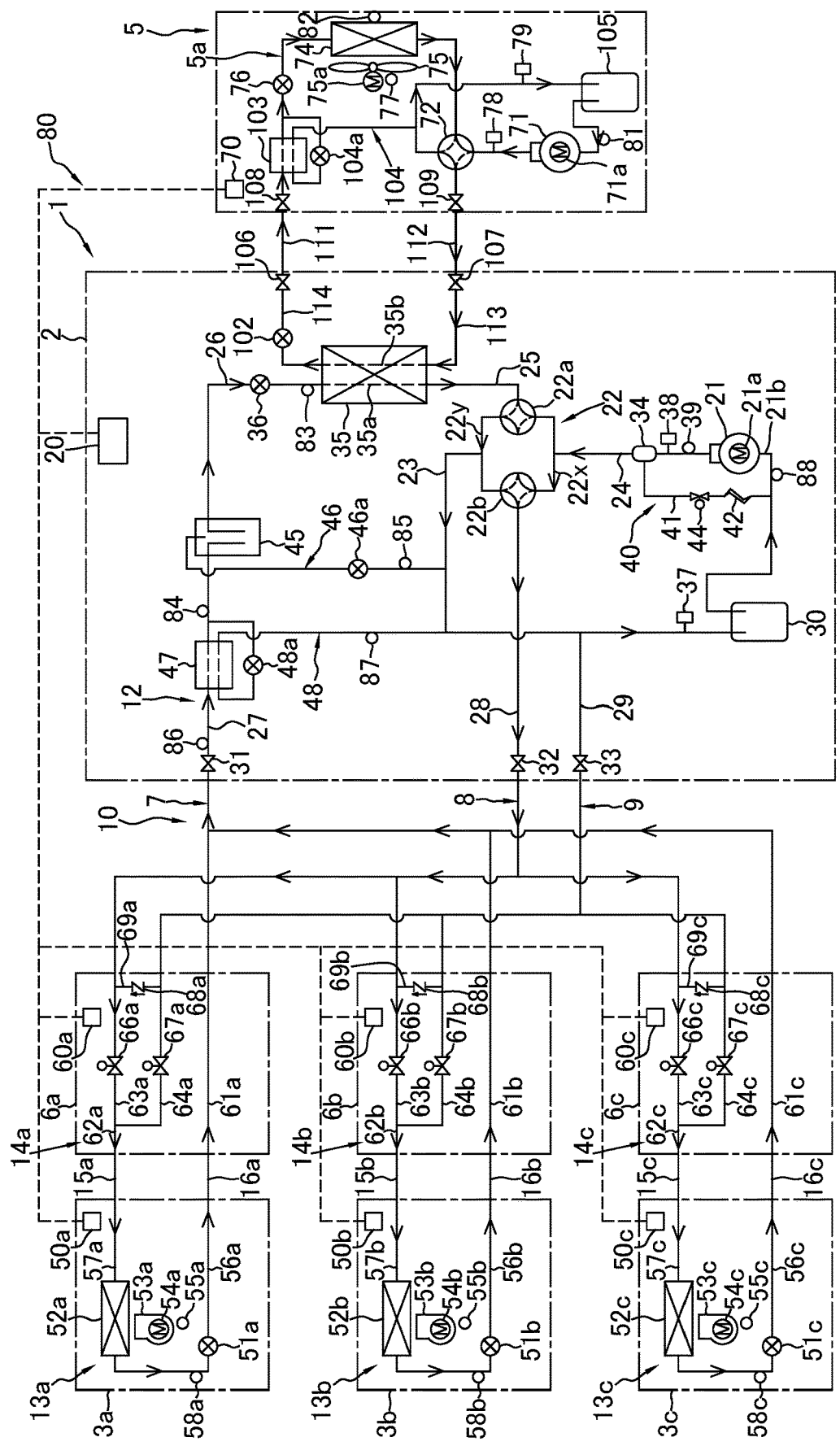
FIG. 4 is a diagram illustrating motion (a flow of a refrigerant) in heating operation of the refrigeration cycle apparatus.

During the heating operation, each of the utilization-side heat exchangers 52a, 52b, and 52c in the utilization units 3a, 3b, and 3c functions as a refrigerant radiator. In the heating operation, the cascade heat exchanger 35 operates to function as an evaporator for the secondary-side refrigerant. In the heating operation, the primary-side refrigerant circuit 5a and the secondary-side refrigerant circuit 10 of the refrigeration cycle apparatus 1 are configured as illustrated in FIG. 4. Arrows attached to the primary-side refrigerant circuit 5a and arrows attached to the secondary-side refrigerant circuit 10 in FIG. 4 indicate flows of the refrigerant during the heating operation.

Specifically, in the primary-side unit 5, the primary-side switching mechanism 72 is switched to a sixth operating state to cause the cascade heat exchanger 35 to function as a radiator for the primary-side refrigerant. The sixth operating state of the primary-side switching mechanism 72 is a connection state depicted by broken lines in the primary-side switching mechanism 72 in FIG. 4. Accordingly, in the primary-side unit 5, the primary-side refrigerant discharged from the primary-side compressor 71, having passed through the primary-side switching mechanism 72 and the first gas shutoff valve 109 passes through the primary-side second connection pipe 112 and the second gas shutoff valve 107 and is sent to the primary-side flow path 35b of the cascade heat exchanger 35. The refrigerant flowing in the primary-side flow path 35b of the cascade heat exchanger 35 is condensed by exchanging heat with the secondary-side refrigerant flowing in the secondary-side flow path 35a. When flowing in the second refrigerant pipe 114, the primary-side refrigerant condensed in the cascade heat exchanger 35 passes through the primary-side second expansion valve 102 controlled to the fully opened state. The refrigerant that has passed through the primary-side second expansion valve 102 flows through the second liquid shutoff valve 106, the primary-side first connection pipe 111, the first liquid shutoff valve 108, and the primary-side subcooling heat exchanger 103 in that order, and is decompressed by the primary-side first expansion valve 76. During heating operation, the primary-side subcooling expansion valve 104a is controlled to the closed state. Accordingly, the refrigerant does not flow to the primary-side subcooling circuit 104 and does not exchange heat in the primary-side subcooling heat exchanger 103. The valve opening degree of the primary-side first expansion valve 76 is controlled such that, for example, the degree of superheating of the refrigerant sucked into the primary-side compressor 71 satisfies a predetermined condition. The refrigerant decompressed by the primary-side first expansion valve 76 evaporates by exchanging heat with outdoor air supplied from the primary-side fan 75 in the primary-side heat exchanger 74, passes through the primary-side switching mechanism 72 and the primary-side accumulator 105, and is sucked into the primary-side compressor 71.

In the cascade unit 2, the secondary-side switching mechanism 22 is switched to the second connection state. The cascade heat exchanger 35 thus functions as an evaporator for the secondary-side refrigerant. In the second connection state of the secondary-side switching mechanism 22, the discharge flow path 24 and the first pipe 28 are connected by the second switching valve 22b, and the third pipe 25 and the suction flow path 23 are connected by the first switching valve 22a. The opening degree of the cascade expansion valve 36 is adjusted. In the first to third branch units 6a, 6b, and 6c, the first regulating valves 66a, 66b, and 66c are controlled to the opened state, and the second regulating valves 67a, 67b, and 67c are controlled to the closed state. Accordingly, all of the utilization-side heat exchangers 52a, 52b, and 52c in the utilization units 3a, 3b, and 3c function as refrigerant radiators. The utilization-side heat exchangers 52a, 52b, and 52c in the utilization units 3a, 3b, and 3c and the discharge side of the secondary-side compressor 21 in the cascade unit 2 are connected via the discharge flow path 24, the first pipe 28, the secondary-side first connection pipe 8, the first branch pipes 63a, 63b, and 63c, the junction pipes 62a, 62b, and 62c, the first connecting tubes 15a, 15b, and 15c, and the first utilization pipes 57a, 57b, and 57c. The secondary-side subcooling expansion valve 48a and the bypass expansion valve 46a are controlled to the closed state. In the utilization units 3a, 3b, and 3c, the opening degrees of the utilization-side expansion valves 51a, 51b, and 51c are adjusted.

During the heating operation, the secondary-side refrigerant circuit 10 controls capacity on the secondary-side compressor 21 so as to achieve a frequency at which the loads in the utilization-side heat exchangers 52a, 52b, and 52c can be processed. As a result, in the heating operation, the secondary-side refrigerant discharged from the secondary-side compressor 21 is controlled to be in a critical state exceeding the critical pressure. The primary-side refrigerant circuit 5a controls capacity, for example, by controlling the frequency of the primary-side compressor 71 such that condensation temperature of the primary-side refrigerant in the primary-side flow path 35b of the cascade heat exchanger 35 becomes a predetermined primary-side condensation target temperature.

In such a secondary-side refrigerant circuit 10, the high-pressure refrigerant compressed and discharged by the secondary-side compressor 21 is sent to the first pipe 28 through the second switching valve 22b of the secondary-side switching mechanism 22. The refrigerant sent to the first pipe 28 is sent to the secondary-side first connection pipe 8 through the first shutoff valve 32.

Then, the high-pressure refrigerant sent to the secondary-side first connection pipe 8 is branched into three portions to be sent to the first branch pipes 63a, 63b, and 63c in the utilization units 3a, 3b, and 3c which are utilization units in operation. The high-pressure refrigerant sent to the first branch pipes 63a, 63b, and 63c passes through the first regulating valves 66a, 66b, and 66c, and flows in the junction pipes 62a, 62b, and 62c. Thereafter, the refrigerant having flowed in the first connecting tubes 15a, 15b, and 15c and the first utilization pipes 57a, 57b, and 57c is sent to the utilization-side heat exchangers 52a, 52b, and 52c.

Then, the high-pressure refrigerant sent to the utilization-side heat exchangers 52a, 52b, and 52c exchanges heat with indoor air supplied by the indoor fans 53a, 53b, and 53c in the utilization-side heat exchangers 52a, 52b, and 52c. The refrigerant flowing in the utilization-side heat exchangers 52a, 52b, and 52c thus radiates heat. The indoor air is heated and supplied into the indoor space. The indoor space is thus heated. The refrigerant having radiated heat in the utilization-side heat exchangers 52a, 52b, and 52c flows in the second utilization pipes 56a, 56b, and 56c and passes through the utilization-side expansion valves 51a, 51b, and 51c whose opening degrees are adjusted. The secondary-side refrigerant that has passed through the utilization-side expansion valves 51a, 51b, and 51c has the critical pressure or less. Thereafter, the refrigerant having flowed through the second connecting tubes 16a, 16b, and 16c flows in the third branch pipes 61a, 61b, and 61c of the branch units 6a, 6b, and 6c.

The refrigerant sent to the third branch pipes 61a, 61b, and 61c is sent to the secondary-side third connection pipe 7 to join.

The refrigerant sent to the secondary-side third connection pipe 7 passes through the third shutoff valve 31 and then is sent to the cascade expansion valve 36. The flow rate of the refrigerant sent to the cascade expansion valve 36 is adjusted at the cascade expansion valve 36, and then, the refrigerant is sent to the cascade heat exchanger 35. In the cascade heat exchanger 35, the secondary-side refrigerant flowing in the secondary-side flow path 35a is evaporated into a low-pressure gas refrigerant and is sent to the secondary-side switching mechanism 22, and the primary-side refrigerant flowing in the primary-side flow path 35b of the cascade heat exchanger 35 is condensed. Then, the secondary-side low-pressure gas refrigerant sent to the first switching valve 22a of the secondary-side switching mechanism 22 is returned to the suction side of the secondary-side compressor 21 through the suction flow path 23 and the secondary-side accumulator 30.

Motion during the heating operation is performed in such a manner.

(9-3) Cooling Main Operation

Figure 5:
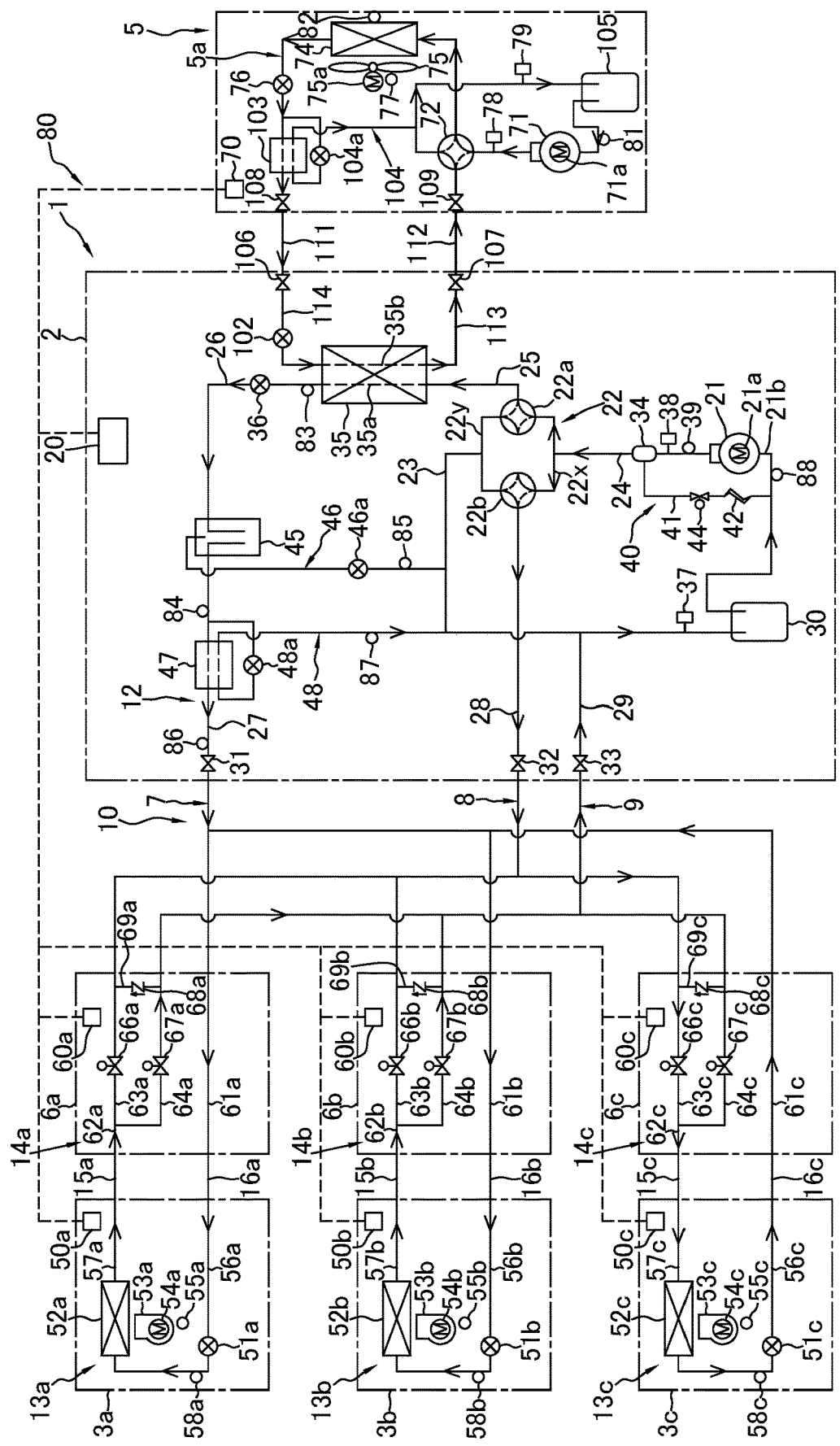
FIG. 5 is a diagram illustrating motion (a flow of a refrigerant) in simultaneous cooling and heating operation (cooling main operation) of the refrigeration cycle apparatus.

During the cooling main operation, for example, the utilization-side heat exchangers 52a and 52b in the utilization units 3a and 3b function as refrigerant evaporators, and the utilization-side heat exchanger 52c in the utilization unit 3c functions as a refrigerant radiator. In the cooling main operation, the cascade heat exchanger 35 functions as a radiator for the secondary-side refrigerant. In the cooling main operation, the primary-side refrigerant circuit 5a and the secondary-side refrigerant circuit 10 of the refrigeration cycle apparatus 1 are configured as illustrated in FIG. 5. Arrows attached to the primary-side refrigerant circuit 5a and arrows attached to the secondary-side refrigerant circuit 10 in FIG. 5 indicate flows of the refrigerant during the cooling main operation.

Specifically, in the primary-side unit 5, the primary-side switching mechanism 72 is switched to the fifth connection state (the state depicted by solid lines in the primary-side switching mechanism 72 in FIG. 5) to cause the cascade heat exchanger 35 to function as an evaporator for the primary-side refrigerant. Accordingly, in the primary-side unit 5, the primary-side refrigerant discharged from the primary-side compressor 71 passes through the primary-side switching mechanism 72 and exchanges heat with outdoor air supplied from the primary-side fan 75 in the primary-side heat exchanger 74 to be condensed. The primary-side refrigerant condensed in the primary-side heat exchanger 74 passes through the primary-side first expansion valve 76 controlled into a fully opened state, and a part of the refrigerant flows toward the first liquid shutoff valve 108 through the primary-side subcooling heat exchanger 103, and another part of the refrigerant branches into the primary-side subcooling circuit 104. The refrigerant flowing in the primary-side subcooling circuit 104 is decompressed when passing through the primary-side subcooling expansion valve 104a. The refrigerant flowing from the primary-side first expansion valve 76 toward the first liquid shutoff valve 108 exchanges heat with the refrigerant decompressed by the primary-side subcooling expansion valve 104a and flowing in the primary-side subcooling circuit 104 in the primary-side subcooling heat exchanger 103, and is cooled until reaching a subcooled state. The refrigerant in the subcooled state flows through the primary-side first connection pipe 111, the second liquid shutoff valve 106, and the second refrigerant pipe 114 in that order, and is decompressed by the primary-side second expansion valve 102. At this time, for example, a valve opening degree of the primary-side second expansion valve 102 is controlled such that the degree of superheating of the refrigerant sucked into the primary-side compressor 71 satisfies a predetermined condition. When flowing in the primary-side flow path 35b of the cascade heat exchanger 35, the primary-side refrigerant decompressed by the primary-side second expansion valve 102 evaporates by exchanging heat with the secondary-side refrigerant in through the secondary-side flow path 35a, and flows toward the second gas shutoff valve 107 through the first refrigerant pipe 113. The refrigerant having passed through the second gas shutoff valve 107 passes through the primary-side second connection pipe 112 and the first gas shutoff valve 109, and then reaches the primary-side switching mechanism 72. The refrigerant having passed through the primary-side switching mechanism 72 joins the refrigerant having flowed through the primary-side subcooling circuit 104, and is then sucked into the primary-side compressor 71 via the primary-side accumulator 105.

In the cascade unit 2, the secondary-side switching mechanism 22 is switched to the third connection state in which the discharge flow path 24 and the third pipe 25 are connected by the first switching valve 22a and the discharge flow path 24 and the first pipe 28 are connected by the second switching valve 22b to cause the cascade heat exchanger 35 to function as a radiator for the secondary-side refrigerant. The opening degree of the cascade expansion valve 36 is adjusted. In the first to third branch units 6a, 6b, and 6c, the first regulating valve 66c and the second regulating valves 67a and 67b are controlled to the opened state, and the first regulating valves 66a and 66b and the second regulating valve 67c are controlled to the closed state. Accordingly, the utilization-side heat exchangers 52a and 52b in the utilization units 3a and 3b function as refrigerant evaporators, and the utilization-side heat exchanger 52c in the utilization unit 3c functions as a refrigerant radiator. The utilization-side heat exchangers 52a and 52b in the utilization units 3a and 3b and the suction side of the secondary-side compressor 21 in the cascade unit 2 are connected via the secondary-side second connection pipe 9, and the utilization-side heat exchanger 52c in the utilization unit 3c and the discharge side of the secondary-side compressor 21 in the cascade unit 2 are connected via the secondary-side first connection pipe 8. In addition, an opening degree of the secondary-side subcooling expansion valve 48a is controlled such that a degree of subcooling of the secondary-side refrigerant flowing through the outlet of the secondary-side subcooling heat exchanger 47 toward the secondary-side third connection pipe 7 satisfies a predetermined condition. The bypass expansion valve 46a is controlled to the closed state. In the utilization units 3a, 3b, and 3c, the opening degrees of the utilization-side expansion valves 51a, 51b, and 51c are adjusted.

In the cooling main operation, the secondary-side refrigerant circuit 10 controls capacity, for example, by controlling the frequency of the secondary-side compressor 21 such that evaporation temperature in a heat exchanger functioning as an evaporator for the secondary-side refrigerant between the utilization-side heat exchanger 52a, 52b, and 52c becomes a predetermined secondary-side evaporation target temperature. The opening degree of the cascade expansion valve 36 is adjusted such that the secondary-side refrigerant flowing in the cascade heat exchanger 35 has a critical pressure or less. The primary-side refrigerant circuit 5a controls capacity, for example, by controlling a frequency of the primary-side compressor 71 such that evaporation temperature of the primary-side refrigerant in the primary-side flow path 35b of the cascade heat exchanger 35 becomes a predetermined primary-side evaporation target temperature. In such a manner, in the cooling operation, either or both of the control for increasing the valve opening degree of the cascade expansion valve 36 and the control for increasing the frequency of the primary-side compressor 71 in the primary-side refrigerant circuit 5a are executed, and thus, the carbon dioxide refrigerant flowing in the cascade heat exchanger 35 is controlled so as not to exceed a critical point.

In such a secondary-side refrigerant circuit 10, a part of the secondary-side high-pressure refrigerant compressed and discharged by the secondary-side compressor 21 is sent to the secondary-side first connection pipe 8 through the second switching valve 22b of the secondary-side switching mechanism 22, the first pipe 28, and the first shutoff valve 32, and the rest is sent to the secondary-side flow path 35a of the cascade heat exchanger 35 through the first switching valve 22a of the secondary-side switching mechanism 22 and the third pipe 25.

Then, the high-pressure refrigerant sent to the secondary-side first connection pipe 8 is sent to the first branch pipe 63c. The high-pressure refrigerant sent to the first branch pipe 63c is sent to the utilization-side heat exchanger 52c in the utilization unit 3c through the first regulating valve 66c and the junction pipe 62c.

Then, the high-pressure refrigerant sent to the utilization-side heat exchanger 52c exchanges heat with indoor air supplied by the indoor fan 53c in the utilization-side heat exchanger 52c. The refrigerant flowing in the utilization-side heat exchanger 52c thus radiates heat. The indoor air is heated and is supplied into the indoor space, and the utilization unit 3c performs the heating operation. The refrigerant having radiated heat in the utilization-side heat exchanger 52c flows in the second utilization pipe 56c, and the flow rate of the refrigerant is adjusted at the utilization-side expansion valve 51c. The refrigerant having flowed through the second connecting tube 16c is sent to the third branch pipe 61c in the branch unit 6c.

Then, the refrigerant sent to the third branch pipe 61c is sent to the secondary-side third connection pipe 7.

The high-pressure refrigerant sent to the secondary-side flow path 35a of the cascade heat exchanger 35 exchanges heat with the primary-side refrigerant flowing in the primary-side flow path 35b in the cascade heat exchanger 35 to radiate heat. The flow rate of the secondary-side refrigerant having radiated heat in the cascade heat exchanger 35 is adjusted at the cascade expansion valve 36, and then the secondary-side refrigerant flows into the secondary-side receiver 45. A part of the refrigerant having flowed out of the secondary-side receiver 45 branches into the secondary-side subcooling circuit 48, is decompressed at the secondary-side subcooling expansion valve 48a, and then joins into the suction flow path 23. In the secondary-side subcooling heat exchanger 47, another part of the refrigerant having flowed out of the secondary-side receiver 45 is cooled by the refrigerant flowing in the secondary-side subcooling circuit 48, is then sent to the secondary-side third connection pipe 7 through the third shutoff valve 31, and joins the refrigerant having radiated heat in the utilization-side heat exchanger 52c.

Then, the refrigerant having joined in the secondary-side third connection pipe 7 is branched into two portions to be sent to the third branch pipes 61a and 61b of the branch units 6a and 6b. Thereafter, the refrigerant having flowed in the second connecting tubes 16a and 16b is sent to the second utilization pipes 56a and 56b of the first and second utilization units 3a and 3b. The refrigerant flowing in the second utilization pipes 56a and 56b passes through the utilization-side expansion valves 51a and 51b in the utilization units 3a and 3b.

The refrigerant having passed through the utilization-side expansion valves 51a and 51b whose opening degrees are adjusted exchanges heat with indoor air supplied by the indoor fans 53a and 53b in the utilization-side heat exchangers 52a and 52b. The refrigerant flowing in the utilization-side heat exchangers 52a and 52b is thus evaporated into a low-pressure gas refrigerant. The indoor air is cooled and is supplied into the indoor space. The indoor space is thus cooled. The low-pressure gas refrigerant evaporated in the utilization-side heat exchangers 52a and 52b is sent to the junction pipes 62a and 62b of the first and second branch units 6a and 6b.

The low-pressure gas refrigerant sent to the junction pipes 62a and 62b is sent to the secondary-side second connection pipe 9 via the second regulating valves 67a and 67b and the second branch pipes 64a and 64b, to join.

The low-pressure gas refrigerant sent to the secondary-side second connection pipe 9 is returned to the suction side of the secondary-side compressor 21 via the second shutoff valve 33, the second pipe 29, the suction flow path 23, and the secondary-side accumulator 30.

Motion during the cooling main operation is performed in such a manner.

(9-4) Heating Main Operation

Figure 6:
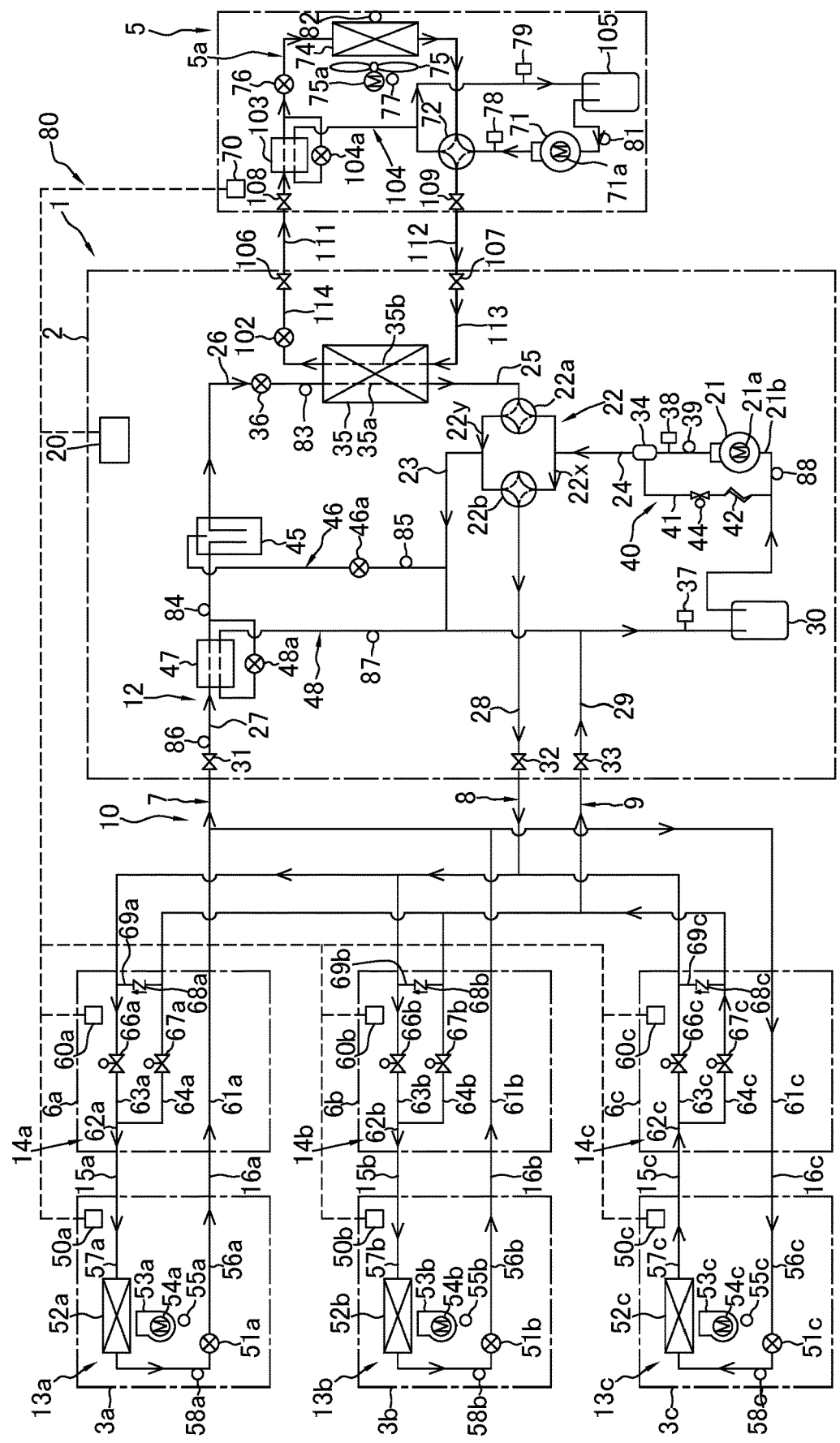
FIG. 6 is a diagram illustrating motion (a flow of a refrigerant) in simultaneous cooling and heating operation (heating main operation) of the refrigeration cycle apparatus.

During the heating main operation, for example, the utilization-side heat exchangers 52a and 52b in the utilization units 3a and 3b function as refrigerant radiators, and the utilization-side heat exchanger 52c functions as a refrigerant evaporator. In the heating main operation, the cascade heat exchanger 35 functions as an evaporator for the secondary-side refrigerant. In the heating main operation, the primary-side refrigerant circuit 5a and the secondary-side refrigerant circuit 10 of the refrigeration cycle apparatus 1 are configured as illustrated in FIG. 6. Arrows attached to the primary-side refrigerant circuit 5a and arrows attached to the secondary-side refrigerant circuit 10 in FIG. 6 indicate flows of the refrigerant during the heating main operation.

Specifically, in the primary-side unit 5, the primary-side switching mechanism 72 is switched to a sixth operating state to cause the cascade heat exchanger 35 to function as a radiator for the primary-side refrigerant. The sixth operating state of the primary-side switching mechanism 72 corresponds to a connection state depicted by broken lines in the primary-side switching mechanism 72 in FIG. 6. Accordingly, in the primary-side unit 5, the primary-side refrigerant discharged from the primary-side compressor 71, having passed through the primary-side switching mechanism 72 and the first gas shutoff valve 109 passes through the primary-side second connection pipe 112 and the second gas shutoff valve 107 and is sent to the primary-side flow path 35b of the cascade heat exchanger 35. The refrigerant flowing in the primary-side flow path 35b of the cascade heat exchanger 35 is condensed by exchanging heat with the secondary-side refrigerant flowing in the secondary-side flow path 35a. When flowing in the second refrigerant pipe 114, the primary-side refrigerant condensed in the cascade heat exchanger 35 passes through the primary-side second expansion valve 102 controlled to the fully opened state. Then, the primary-side refrigerant flows through the second liquid shutoff valve 106, the primary-side first connection pipe 111, the first liquid shutoff valve 108, and the primary-side subcooling heat exchanger 103 in that order, and is decompressed by the primary-side first expansion valve 76. During the heating main operation, the primary-side subcooling expansion valve 104a is controlled to the closed state. Accordingly, the refrigerant does not flow into the primary-side subcooling circuit 104 and does not exchange heat in the primary-side subcooling heat exchanger 103. The valve opening degree of the primary-side first expansion valve 76 is controlled such that, for example, the degree of superheating of the refrigerant sucked into the primary-side compressor 71 satisfies a predetermined condition. The refrigerant decompressed by the primary-side first expansion valve 76 evaporates by exchanging heat with outdoor air supplied from the primary-side fan 75 in the primary-side heat exchanger 74, passes through the primary-side switching mechanism 72 and the primary-side accumulator 105, and is sucked into the primary-side compressor 71.

In the cascade unit 2, the secondary-side switching mechanism 22 is switched to the second connection state. In the second connection state of the secondary-side switching mechanism 22, the discharge flow path 24 and the first pipe 28 are connected by the second switching valve 22b, and the third pipe 25 and the suction flow path 23 are connected by the first switching valve 22a. The cascade heat exchanger 35 thus functions as an evaporator for the secondary-side refrigerant. The opening degree of the cascade expansion valve 36 is adjusted. In the first to third branch units 6a, 6b, and 6c, the first regulating valves 66a and 66b and the second regulating valve 67c are controlled to the opened state, and the first regulating valve 66c and the second regulating valves 67a and 67b are controlled to the closed state. Accordingly, the utilization-side heat exchangers 52a and 52b in the utilization units 3a and 3b function as refrigerant radiators, and the utilization-side heat exchanger 52c in the utilization unit 3c functions as a refrigerant evaporator. The utilization-side heat exchanger 52c in the utilization unit 3c and the suction side of the secondary-side compressor 21 in the cascade unit 2 are connected via the first utilization pipe 57c, the first connecting tube 15c, the junction pipe 62c, the second branch pipe 64c, and the secondary-side second connection pipe 9. The utilization-side heat exchangers 52a and 52b in the utilization units 3a and 3b and the discharge side of the secondary-side compressor 21 in the cascade unit 2 are connected via the discharge flow path 24, the first pipe 28, the secondary-side first connection pipe 8, the first branch pipes 63a and 63b, the junction pipes 62a and 62b, the first connecting tubes 15a and 15b, and the first utilization pipes 57a and 57b. The secondary-side subcooling expansion valve 48a and the bypass expansion valve 46a are controlled to the closed state. In the utilization units 3a, 3b, and 3c, the opening degrees of the utilization-side expansion valves 51a, 51b, and 51c are adjusted.

In the heating main operation, the secondary-side refrigerant circuit 10 controls capacity, for example, by controlling the frequency of the secondary-side compressor 21 so as to process a load in a heat exchanger functioning as a radiator for the secondary-side refrigerant between the utilization-side heat exchangers 52a, 52b, and 52c. As a result, in the heating main operation, the secondary-side refrigerant discharged from the secondary-side compressor 21 is controlled to be in the critical state exceeding the critical pressure. The primary-side refrigerant circuit 5a controls capacity, for example, by controlling the frequency of the primary-side compressor 71 such that condensation temperature of the primary-side refrigerant in the primary-side flow path 35b of the cascade heat exchanger 35 becomes a predetermined primary-side condensation target temperature.

In such a secondary-side refrigerant circuit 10, the high-pressure secondary-side refrigerant compressed and discharged by the secondary-side compressor 21 is sent to the secondary-side first connection pipe 8 through the second switching valve 22b of the secondary-side switching mechanism 22, the first pipe 28, and the first shutoff valve 32.

The high-pressure refrigerant sent to the secondary-side first connection pipe 8 is branched into two portions to be sent to the first branch pipes 63a and 63b of the first branch unit 6a and the second branch unit 6b connected to the first utilization unit 3a and the second utilization unit 3b which are utilization units in operation. The high-pressure refrigerant sent to the first branch pipes 63a and 63b is sent to the utilization-side heat exchangers 52a and 52b in the first utilization unit 3a and the second utilization unit 3b via the first regulating valves 66a and 66b, the junction pipes 62a and 62b, and the first connecting tubes 15a and 15b.

The high-pressure refrigerant sent to the utilization-side heat exchangers 52a and 52b exchanges heat with indoor air supplied by the indoor fans 53a and 53b in the utilization-side heat exchangers 52a and 52b. The refrigerant flowing in the utilization-side heat exchangers 52a and 52b thus radiates heat. The indoor air is heated and supplied into the indoor space. The indoor space is thus heated. The refrigerant having radiated heat in the utilization-side heat exchangers 52a and 52b flows in the second utilization pipes 56a and 56b, and passes through the utilization-side expansion valves 51a and 51b whose opening degree is adjusted. The secondary-side refrigerant that has passed through the utilization-side expansion valves 51a and 51b has the critical pressure or less. Thereafter, the refrigerant having flowed through the second connecting tubes 16a and 16b is sent to the secondary-side third connection pipe 7 via the third branch pipes 61a and 61b of the branch units 6a and 6b.

A part of the refrigerant sent to the secondary-side third connection pipe 7 is sent to the third branch pipe 61c of the branch unit 6c, and the rest flows toward the third shutoff valve 31.

Then, the refrigerant sent to the third branch pipe 61c flows in the second utilization pipe 56c of the utilization unit 3c via the second connecting tube 16c, and is sent to the utilization-side expansion valve 51c.

The refrigerant having passed through the utilization-side expansion valve 51c whose opening degree is adjusted exchanges heat with indoor air supplied by the indoor fan 53c in the utilization-side heat exchanger 52c. The refrigerant flowing in the utilization-side heat exchanger 52c is thus evaporated into a low-pressure gas refrigerant. The indoor air is cooled and is supplied into the indoor space. The indoor space is thus cooled. The low-pressure gas refrigerant evaporated in the utilization-side heat exchanger 52c passes through the first utilization pipe 57c and the first connecting tube 15c to be sent to the junction pipe 62c.

The low-pressure gas refrigerant sent to the junction pipe 62c is sent to the secondary-side second connection pipe 9 through the second regulating valve 67c and the second branch pipe 64c.

The low-pressure gas refrigerant sent to the secondary-side second connection pipe 9 is returned to the suction side of the secondary-side compressor 21 via the second shutoff valve 33, the second pipe 29, the suction flow path 23, and the secondary-side accumulator 30.

The refrigerant flowing toward the third shutoff valve 31 is sent to the cascade expansion valve 36. The refrigerant sent to the cascade expansion valve 36 passes through the cascade expansion valve 36 whose opening degree is adjusted, and then exchanges heat with the primary-side refrigerant flowing in the primary-side flow path 35b in the secondary-side flow path 35a of the cascade heat exchanger 35. As a result, the refrigerant flowing in the secondary-side flow path 35a of the cascade heat exchanger 35 evaporates to become a low-pressure gas refrigerant, and is sent to the first switching valve 22a of the secondary-side switching mechanism 22. The low-pressure gas refrigerant sent to the first switching valve 22a of the secondary-side switching mechanism 22 joins the low-pressure gas refrigerant evaporated in the utilization-side heat exchanger 52c in the suction flow path 23. The refrigerant thus joined is returned to the suction side of the secondary-side compressor 21 via the secondary-side accumulator 30.

Motion during the heating main operation is performed in such a manner.

(10) Connection Configuration between Primary-Side Unit and Cascade Unit

FIG. 7 is a schematic external view illustrating a state in which the primary-side unit 5 and the cascade unit 2 are connected.

The primary-side unit 5 includes the primary-side casing 5x having a plurality of surfaces and a substantially rectangular parallelepiped shape. The primary-side casing 5x accommodates, as part of the primary-side refrigerant circuit 5a, the primary-side compressor 71, the primary-side switching mechanism 72, the primary-side heat exchanger 74, the primary-side first expansion valve 76, the primary-side subcooling heat exchanger 103, the primary-side subcooling circuit 104, the primary-side subcooling expansion valve 104a, the first liquid shutoff valve 108, the first gas shutoff valve 109, and the primary-side accumulator 105. Extended from the primary-side casing 5x are the primary-side first connection pipe 111 and the primary-side second connection pipe 112 as a part of the primary-side refrigerant circuit 5a.

The cascade unit 2 includes the cascade casing 2x having a substantially rectangular parallelepiped shape. The cascade casing 2x accommodates a part of the secondary-side refrigerant circuit 10 and a part of the primary-side refrigerant circuit 5a. A part of the secondary-side refrigerant circuit 10 accommodated in the cascade casing 2x is the cascade circuit 12 including the secondary-side compressor 21, the secondary-side switching mechanism 22, the first pipe 28, the second pipe 29, the suction flow path 23, the discharge flow path 24, the third pipe 25, the fourth pipe 26, the fifth pipe 27, the secondary-side flow path 35a of the cascade heat exchanger 35, the cascade expansion valve 36, the third shutoff valve 31, the first shutoff valve 32, the second shutoff valve 33, the secondary-side accumulator 30, the oil separator 34, the oil return circuit 40, the secondary-side receiver 45, the bypass circuit 46, the bypass expansion valve 46a, the secondary-side subcooling heat exchanger 47, the secondary-side subcooling circuit 48, and the secondary-side subcooling expansion valve 48a. A part of the primary-side refrigerant circuit 5a accommodated in the cascade casing 2x includes the second liquid shutoff valve 106, the second refrigerant pipe 114, the primary-side second expansion valve 102, the primary-side flow path 35b of the cascade heat exchanger 35, the first refrigerant pipe 113, and the second gas shutoff valve 107. Extended from the cascade casing 2x are the secondary-side third connection pipe 7, the secondary-side first connection pipe 8, and the secondary-side second connection pipe 9 as a part of the secondary-side refrigerant circuit 10. Extended from the cascade casing 2x are the primary-side first connection pipe 111 and the primary-side second connection pipe 112 as a part of the primary-side refrigerant circuit 5a.

The cascade casing 2x includes a plurality of surfaces including a top surface 120a, a right side surface 120b, a front surface 120c, a left side surface 120d, a back surface 120e, and a bottom surface 120f. Among these surfaces, the front surface 120c is provided with a connection opening 120x. The primary-side first connection pipe 111, the primary-side second connection pipe 112, the secondary-side third connection pipe 7, the secondary-side first connection pipe 8, and the secondary-side second connection pipe 9 pass through the connection opening 120x. The cascade heat exchanger 35 is placed on the bottom surface 120f.

The second liquid shutoff valve 106 connected with the primary-side first connection pipe 111 and the second gas shutoff valve 107 connected with the primary-side second connection pipe 112 are located in the connection opening 120x of the cascade casing 2x. Similarly, the third shutoff valve 31 to which the secondary-side third connection pipe 7 is connected, the first shutoff valve 32 to which the secondary-side first connection pipe 8 is connected, and the second shutoff valve 33 to which the secondary-side second connection pipe 9 is connected are located inside the connection opening 120x of the cascade casing 2x.

The top surface 120a of the cascade casing 2x is provided with a top surface opening 120z opened to allow air to flow in an up-down direction. The front surface 120c of the cascade casing 2x is provided with a front surface opening 120y opened to allow air to flow in a front-rear direction.

(11) Cascade-Side Control Unit

As illustrated in FIG. 7, the cascade-side control unit 20 is provided near an upper front side inside the cascade casing 2x of the cascade unit 2 so as to face a back surface side of the front surface 120c. The cascade-side control unit 20 is disposed on a front side of and above the secondary-side compressor 21, and in the present embodiment, the cascade-side control unit 20 and the secondary-side compressor 21 are disposed so as to partially overlap each other in front view.

Figure 8:
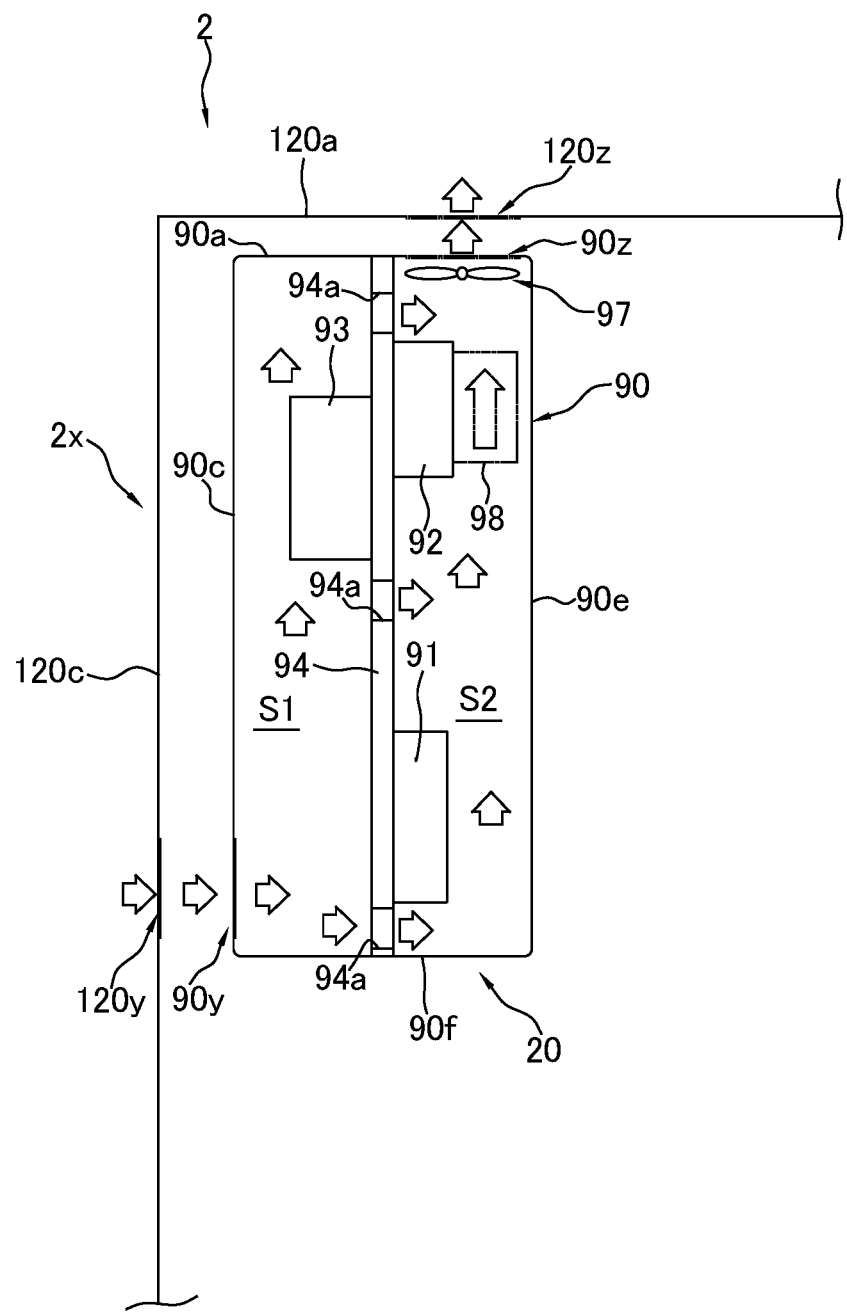
FIG. 8 is a schematic side-view configuration diagram of a cascade-side control unit.

FIG. 8 is a schematic side-view configuration diagram of the cascade-side control unit 20.

The cascade-side control unit 20 includes an electric component casing 90, an electric component mounting plate 94, a first electric component 91, a second electric component 92, a third electric component 93, a heat sink 98, an electric component fan 97, and the like.

The electric component casing 90 has a substantially rectangular parallelepiped shape including a top surface 90a, a bottom surface 90f, a front surface 90c, a back surface 90e, and a left side surface and a right side surface (not illustrated), and is a casing including a sheet metal. The electric component casing 90 accommodates the electric component mounting plate 94, the first electric component 91, the second electric component 92, and the third electric component 93.

The top surface 90a of the electric component casing 90 is provided with a top surface opening 90z opened to allow air to flow in the up-down direction in an upper part of a space S2 on the back surface side of the electric component mounting plate 94. The front surface 90c of the electric component casing 90 is provided with a front surface opening 90y opened to allow air to flow in the front-rear direction at a position farther from the top surface opening 90z in a lower part of a space S1 on a front surface side of the electric component mounting plate 94. The top surface opening 120z of the cascade casing 2x and the top surface opening 90z of the electric component casing 90 are disposed so as to overlap each other in plan view. The front surface opening 120y of the cascade casing 2x and the front surface opening 90y of the electric component casing 90 are disposed so as to overlap each other in front view. Note that the electric component casing 90 has no opening in the back surface 90e and the bottom surface 90f. Therefore, air near the secondary-side compressor 21 hardly flows into the electric component casing 90.

The electric component mounting plate 94 is provided so as to partition the inside of the electric component casing 90 into the front space S1 and the rear space S2 in an orientation in which a thickness direction is the front-rear direction. The electric component mounting plate 94 has a front surface 94x to which the third electric component 93 is mounted and a back surface 94y to which the first electric component 91 and the second electric component 92 are mounted. Ventilation openings 94a opened in the front and rear plate thickness direction are provided in a lower part of, near the center of, and in an upper part of the electric component mounting plate 94.

The first electric component 91, the second electric component 92, and the third electric component 93 are all electric components constituting the cascade-side control unit 20.

The first electric component 91 is an electric component for an inverter of the secondary-side compressor 21, and is an intelligent power module (IPM) which is a heat generating component. The first electric component 91 is provided near a lower part of the back surface 94y of the electric component mounting plate 94.

The second electric component 92 is an electric component including a noise filter which is a heat generating component. The second electric component 92 is provided near an upper part of the back surface 94y of the electric component mounting plate 94 and above the first electric component 91.

The third electric component 93 is an electric component including a main control board. The third electric component 93 is provided near an upper part of the front surface 94x of the electric component mounting plate 94.

The second electric component 92 of the cascade-side control unit 20 is provided with the heat sink 98 constituting a heat dissipation fin for promoting heat release from the electric component. The heat sink 98 is configured such that a plurality of heat dissipation fins extends toward the back surface side of the second electric component 92. The heat dissipation fins are disposed side by side at predetermined intervals in a left-right direction such that the thickness direction is the left-right direction.

The electric component fan 97 is provided at a position in an upper part of the space S2 on the back surface side inside the electric component casing 90 and facing the top surface opening 90z. The electric component fan 97 is disposed closer to the top surface opening 90z than the electric components disposed in the electric component casing 90. The electric component fan 97 is driven to form an air flow in the up-down direction.

When the electric component fan 97 is driven, an air flow for cooling the first electric component 91, the second electric component 92, and the third electric component 93 is generated in the electric component casing 90 as indicated by arrows in FIG. 8. Specifically, the outdoor air is taken into the electric component casing 90 by sequentially passing through the front surface opening 120y of the cascade casing 2x and the front surface opening 90y of the electric component casing 90. In the electric component casing 90, the air passes through the ventilation openings 94a of the electric component mounting plate 94 while rising in the space S1 on the front side, and is sent to the space S2 on the back surface side. The air having risen in the space S1 on the front side passes around the third electric component 93 to cool the third electric component 93. The air having reached the space S2 on the back surface side passes around the first electric component 91 to cool the first electric component 91 and rise in the space S2. The air flow rising in the space S2 passes through the heat sink 98 to efficiently cool the second electric component 92.

The air that has risen in the space S2 on the back surface side as described above passes through the top surface opening 90z of the electric component casing 90 and the top surface opening 120z of the cascade casing 2x in that order by the electric component fan 97 and is discharged to outdoors.

(12) Characteristics of Embodiment

In the refrigeration cycle apparatus 1 according to the present embodiment, the cascade unit 2 is provided with the cascade heat exchanger 35 that exchanges heat between the primary-side refrigerant flowing in the primary-side refrigerant circuit 5a and the secondary-side refrigerant flowing in the secondary-side refrigerant circuit 10, and is not provided with a heat exchanger that exchanges heat with air. The cascade unit 2 is thus not provided with a fan that supplies an air flow to the heat exchanger. Therefore, in order to cool the first electric component 91, the second electric component 92, and the third electric component 93, which are heat generating components in the cascade-side control unit 20, an air flow toward the heat exchanger cannot be used.

However, in the refrigeration cycle apparatus 1 according to the present embodiment, the cascade unit 2 is not provided with a fan that supplies an air flow to the heat exchanger, but the electric component fan 97 is provided in the electric component casing 90 of the cascade-side control unit 20. Accordingly, an air flow passing around the first electric component 91, the second electric component 92, and the third electric component 93 can be formed in the electric component casing 90, and the first electric component 91, the second electric component 92, and the third electric component 93 can be cooled.

Note that the air flow in the electric component casing 90 can be formed only by driving the electric component fan 97. Therefore, for example, unlike a device in which a fan for controlling the state of the refrigerant flowing through the heat exchanger is driven, it is possible to cool the electric components regardless of the state of the refrigerant flowing through the heat exchanger.

The electric component fan 97 is provided near the top surface opening 90z in the electric component casing 90, and is provided at a position far from the front surface opening 90y of the electric component casing 90. Therefore, when the electric component fan 97 is driven, the inside of the electric component casing 90 is likely to have a negative pressure, and an air flow is likely to be generated in the entire electric component casing 90.

Furthermore, the front surface opening 120y provided on the front surface 120c of the cascade casing 2x is provided on the front side of the front surface opening 90y of the electric component casing 90. Therefore, unwarmed outdoor air is easily taken into the electric component casing 90, and the first electric component 91, the second electric component 92, and the third electric component 93 can be efficiently cooled.

The front surface opening 90y through which air is taken into the electric component casing 90 is disposed at a position far from the position of the secondary-side compressor 21 in the cascade casing 2x. The secondary-side compressor 21 is not disposed upstream of the front surface opening 90y in a direction of the air flow. A high-temperature carbon dioxide refrigerant in the supercritical state can be discharged from the secondary-side compressor 21, and the front surface opening 90y of the electric component casing 90 can be located far from the refrigerant pipe through which the high-temperature supercritical refrigerant flows. Accordingly, waste heat from the secondary-side compressor 21 and waste heat from the refrigerant pipe through which the high-temperature supercritical refrigerant flows are prevented from being taken into the electric component casing 90.

In the refrigeration cycle apparatus 1 according to the present embodiment, the primary-side refrigerant circuit 5a can control capacity by the primary-side compressor 71 and the like. Thus, even if the temperature of the outdoor air changes, the capacity is controlled in the primary-side refrigerant circuit 5a, so that it is easy to secure an amount of heat exchange required in the secondary-side flow path 35a of the cascade heat exchanger 35 of the secondary-side refrigerant circuit 10. As a result, even if the temperature of the outdoor air changes, the amount of heat exchange in the secondary-side flow path 35a of the cascade heat exchanger 35 can be controlled so as to cope with load processing required in the secondary-side refrigerant circuit 10.

Since the binary refrigeration cycle is adopted in the refrigeration cycle apparatus 1 according to the present embodiment, the secondary-side refrigerant circuit 10 can provide sufficient capacity as compared with a case of a single refrigeration cycle. In addition, since heat can be received from the primary-side refrigerant circuit 5a in the refrigeration cycle apparatus 1 according to the present embodiment adopting the binary refrigeration cycle, the capacity of the secondary-side compressor 21 can be reduced as compared with the case of the single unit refrigeration cycle. Accordingly, a heat generation amount can be suppressed to be small even in the first electric component 91 which is an IPM for the inverter of the secondary-side compressor 21. Therefore, abnormal heat generation can be sufficiently suppressed only by blowing and cooling by the electric component fan 97.

(13) Other Embodiments (13-1) Another Embodiment A

In the above embodiment, as an example, a case has been described where the first electric component 91, the second electric component 92, and the third electric component 93 in the cascade-side control unit 20 are cooled by the air flow formed by the electric component fan 97.

Figure 9:
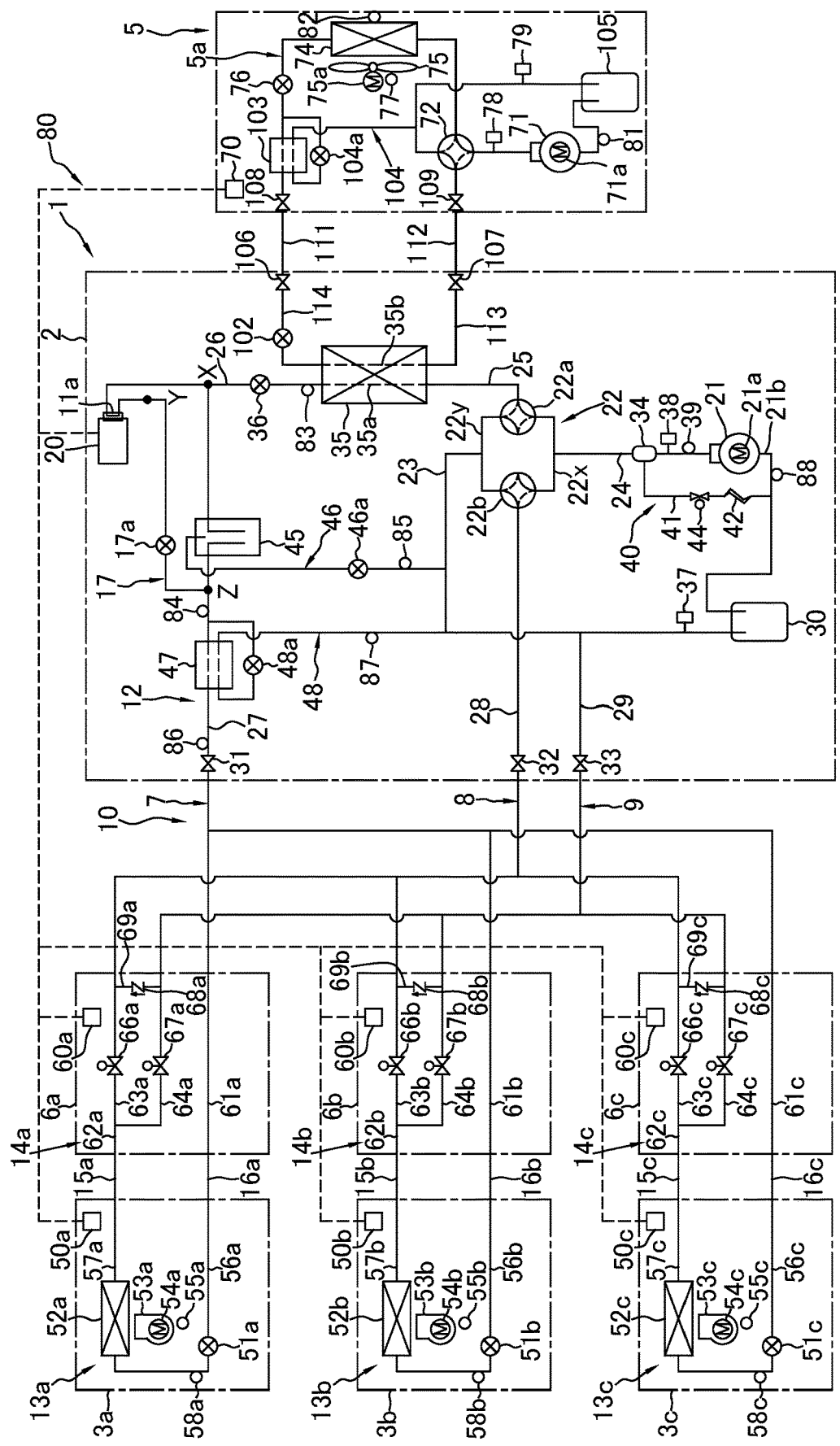
FIG. 9 is a schematic configuration diagram of a refrigeration cycle apparatus according to another embodiment A.
Figure 10:
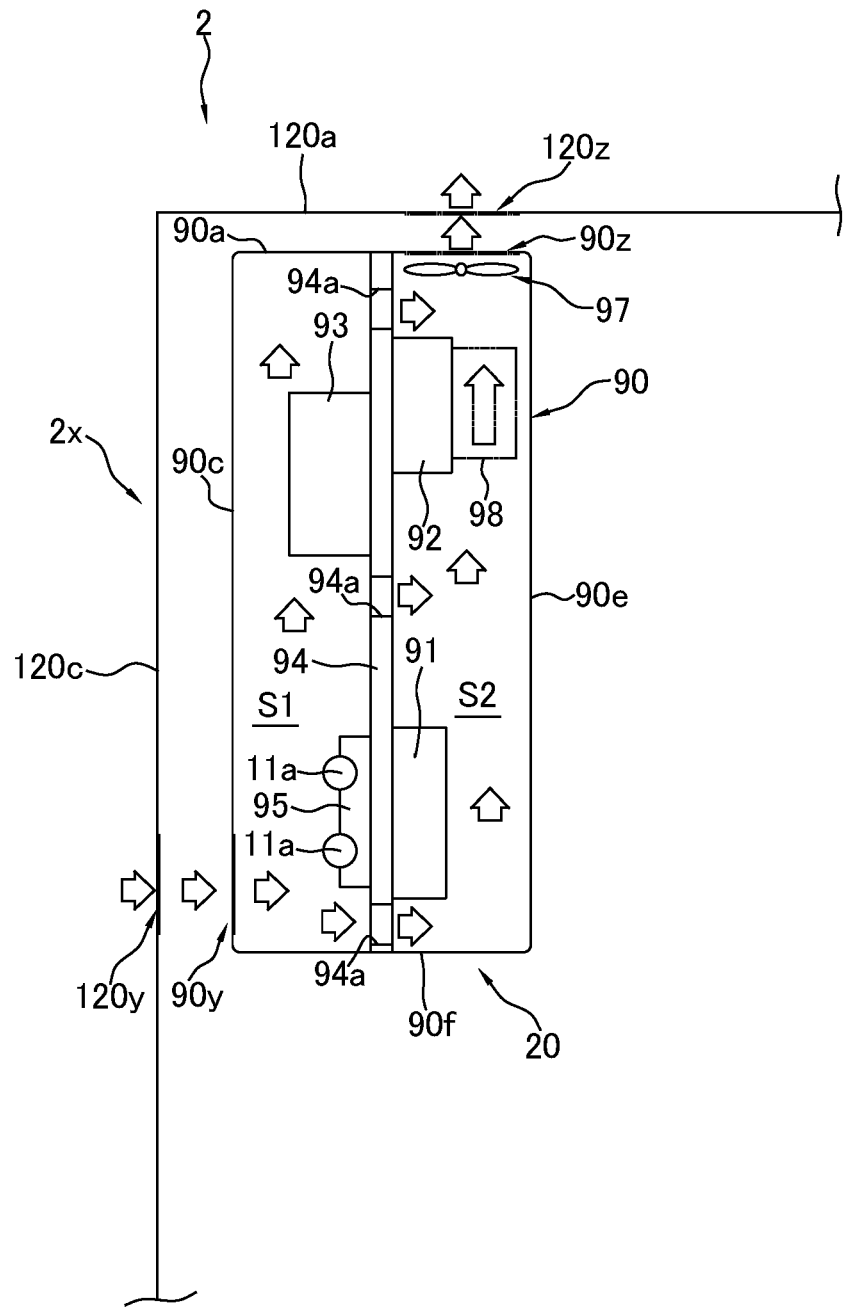
FIG. 10 is a schematic configuration diagram of a side-view schematic configuration diagram of a cascade-side control unit and a periphery of the cascade-side control unit according to another embodiment A.

Alternatively, for example, as illustrated in FIGS. 9 and 10, not only the first electric component 91, the second electric component 92, and the third electric component 93 in the cascade-side control unit 20 are cooled by the air flow, but also any of the electric components may be cooled by using the secondary-side refrigerant flowing in the secondary-side refrigerant circuit 10. For example, the first electric component 91 may be cooled by causing the secondary-side refrigerant flowing in the secondary-side refrigerant circuit 10 to flow into a cooling portion 11a provided in the electric component cooling flow path 17, and the first electric component 91, the second electric component 92, and the third electric component may be cooled by using the electric component fan 97.

The electric component cooling flow path 17 is a refrigerant flow path that connects a portion X of the fourth pipe 26 between the cascade expansion valve 36 and the secondary-side receiver 45 and a portion Z of the fifth pipe 27 between the secondary-side subcooling heat exchanger 47 and the secondary-side receiver 45. The electric component cooling flow path 17 includes the cooling portion 11$a$ for cooling the first electric component 91 described later of the cascade-side control unit 20, and an electric component expansion valve 17$a$. In the electric component cooling flow path 17, the portion X, the cooling portion 11$a$, the electric component expansion valve 17$a$, and the portion Z are arranged in that order. The electric component expansion valve 17$a$ is an electric expansion valve that can adjust the flow rate of the secondary-side refrigerant flowing through the electric component cooling flow path 17.

The cooling portion 11$a$ is fixed to a portion near a lower side of the front surface 94$x$ of the electric component mounting plate 94 and below the third electric component 93 via a heat transfer member 95 including metal. The cooling portion 11$a$ extends so as to be folded back in the left-right direction in front view. The cooling portion 11$a$, the heat transfer member 95, and the first electric component 91 are disposed so as to have an overlapping portion in front view.

In the above configuration, the opening degree of the electric component expansion valve 17$a$ is controlled to the fully opened state or a predetermined opening degree during the cooling operation, the heating operation, the cooling main operation, or the heating main operation, and thus, the secondary-side refrigerant can flow to the cooling portion 11$a$. The cold of the secondary-side refrigerant is transferred to the first electric component 91 via the heat transfer member 95 to suppress a temperature rise of the first electric component 91.

Here, in the secondary-side refrigerant circuit 10, a carbon dioxide refrigerant that can be in the supercritical state where behavior becomes unstable is used as the refrigerant. However, the carbon dioxide refrigerant flowing in the cascade heat exchanger 35 does not exchange heat with outdoor air whose temperature naturally changes due to weather change, but exchanges heat with the primary-side refrigerant flowing in the primary-side refrigerant circuit 5$a$. When the cascade heat exchanger 35 functions as a radiator for the secondary-side refrigerant, the temperature and flow rate of the primary-side refrigerant flowing in the cascade heat exchanger 35 are controlled. As a result, it is possible to prevent the secondary-side refrigerant that is sent to the cooling portion 11$a$ after passing through the cascade heat exchanger 35 from being brought into the supercritical state, and it is possible to avoid a situation in which the temperature of the secondary-side refrigerant is likely to change greatly. Therefore, the temperature of the secondary-side refrigerant flowing in the cooling portion 11$a$ can be stabilized, and the temperature of the first electric component 91 can be prevented from being abnormally increased. When the cascade heat exchanger 35 functions as a radiator for the secondary-side refrigerant, the pressure of the secondary-side refrigerant to be sent to the cooling portion 11$a$ can be made the critical pressure or lower by performing control to increase the valve opening degree of the cascade expansion valve 36. Accordingly, it is possible to stabilize the temperature of the secondary-side refrigerant flowing in the cooling portion 11$a$.

(13-2) Another Embodiment B

In the above embodiment, description has been made by exemplifying a case where the electric component fan 97 is disposed in the electric component casing 90, the top surface opening 120$z$ of the cascade casing 2$x$ and the top surface opening 90$z$ of the electric component casing 90 are disposed so as to overlap each other in plan view, and the front surface opening 120$y$ of the cascade casing 2$x$ and the front surface opening 90$y$ of the electric component casing 90 are disposed so as to overlap each other in front view.

Figure 11:
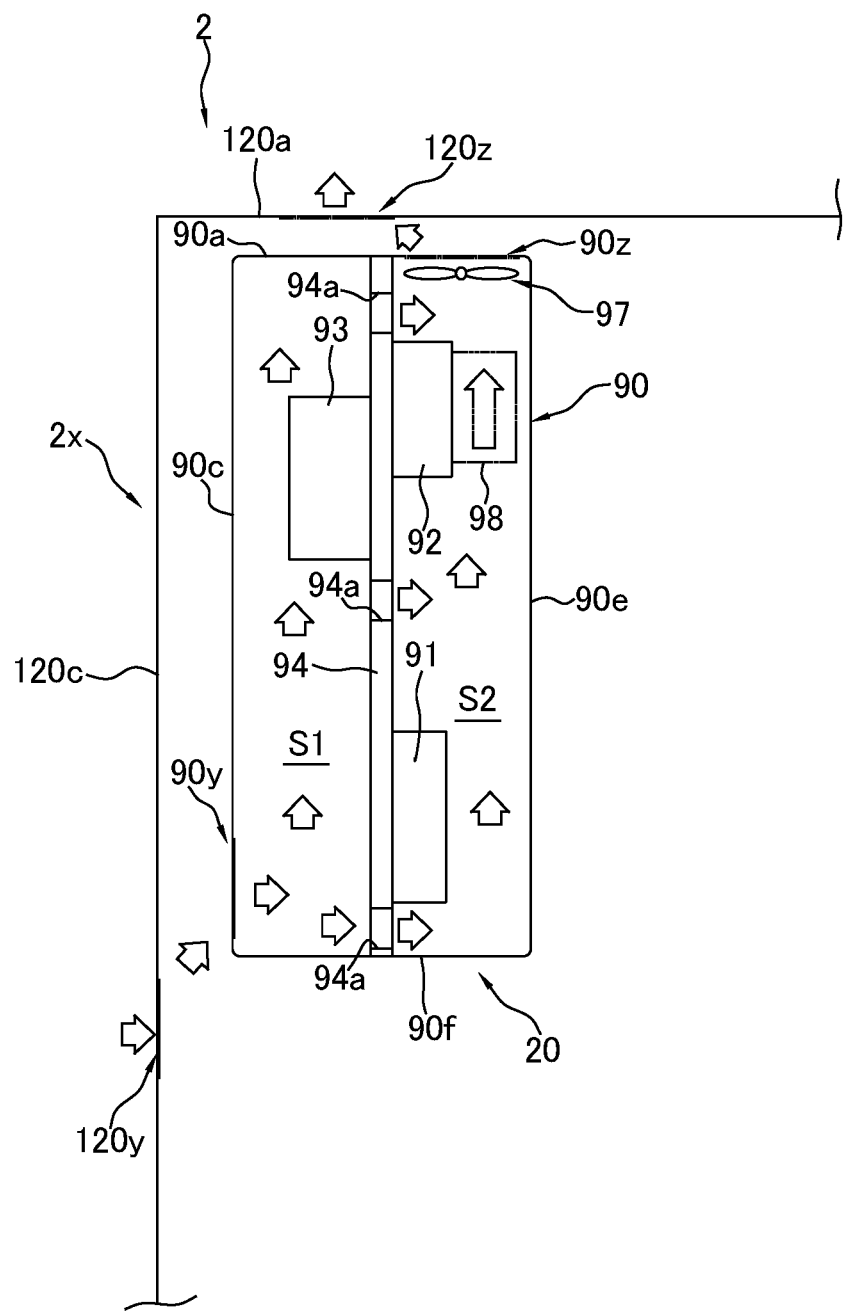
FIG. 11 is a schematic configuration diagram of a side-view schematic configuration diagram of a cascade-side control unit and a periphery of the cascade-side control unit according to another embodiment B.

Alternatively, for example, as illustrated in FIG. 11, the top surface opening 90$z$ of the electric component casing 90 may be disposed so as to have a portion that does not overlap the top surface opening 120$z$ of the cascade casing 2$x$ in plan view, or may be disposed so as not to overlap the top surface opening 120$z$ of the cascade casing 2$x$ at all. Furthermore, the front surface opening 90$y$ of the electric component casing 90 may be disposed so as to have a portion that does not overlap the front surface opening 120$y$ of the cascade casing 2$x$ in front view or when viewed from around. In this case, for example, an upper end of the front surface opening 90$y$ of the electric component casing 90 is preferably disposed at a position higher than an upper end of the front surface opening 120$y$ of the cascade casing 2$x$, and a lower end of the front surface opening 90$y$ of the electric component casing 90 is more preferably disposed at a position higher than the upper end of the front surface opening 120$y$ of the cascade casing 2$x$.

By adopting such a water shielding structure, rainwater is prevented from reaching the inside of the electric component casing 90 even when the cascade unit 2 is disposed outdoors.

(13-3) Another Embodiment C

In the above embodiment, description has been made by exemplifying a structure in which the electric component fan 97 is disposed in the electric component casing 90, the first electric component 91 is provided on one surface of the electric component mounting plate 94 in the cascade-side control unit 20, and the second electric component 92 and the third electric component 93 are provided on the other surface of the electric component mounting plate 94.

Figure 12:
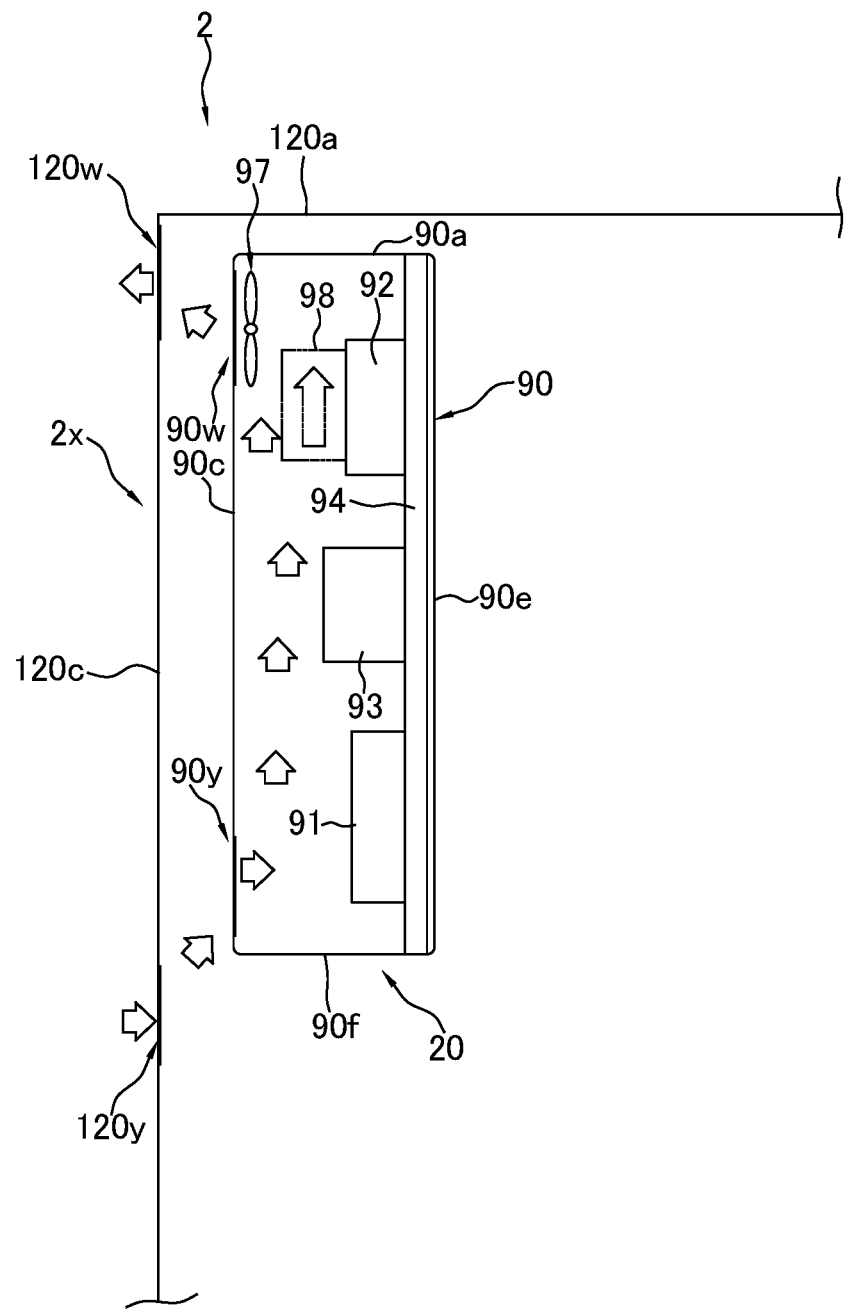
FIG. 12 is a schematic configuration diagram of a side-view schematic configuration diagram of a cascade-side control unit and a periphery of the cascade-side control unit according to another embodiment C.

Alternatively, for example, as illustrated in FIG. 12, the cascade-side control unit 20 may have a structure in which all the electric components, namely, the first electric component 91, the second electric component 92, and the third electric component 93 are provided on one side surface of the electric component mounting plate 94.

As in another embodiment B described above, the front surface opening 90$y$ of the electric component casing 90 may be disposed so as to have a portion that does not overlap the front surface opening 120$y$ of the cascade casing 2$x$ in front view or when viewed from around. In this case, for example, an upper end of the front surface opening 90$y$ of the electric component casing 90 is preferably disposed at a position higher than an upper end of the front surface opening 120$y$ of the cascade casing 2$x$, and a lower end of the front surface opening 90$y$ of the electric component casing 90 is more preferably disposed at a position higher than the upper end of the front surface opening 120$y$ of the cascade casing 2$x$. The front surface opening 90$y$ of the electric component casing 90 is preferably located below the center in a height direction of the electric component casing 90.

The electric component casing 90 may have an exhaust opening 90$w$ for guiding the flow of air exhausted from the electric component fan 97 to the outside of the electric component casing 90. The exhaust opening 90$w$ is preferably provided on a front surface side of the electric component casing 90 and at a position away from the front surface opening 90$y$. When the front surface opening 90$y$ is located below, the exhaust opening 90$w$ is preferably located above the center in the height direction of the electric component casing 90.

Similarly, the cascade casing 2x may have an exhaust opening 120w for guiding the flow of air exhausted from the electric component fan 97 to outdoors. The exhaust opening 120w is preferably provided on the front surface side of the cascade casing 2x and at a position away from the front surface opening 120y. The exhaust opening 120w of the cascade casing 2x may have a portion that overlaps the exhaust opening 90w of the electric component casing 90 in front view.

As a result, in the air flow formed by the electric component fan 97, it is possible to suppress a short circuit in which the air exhausted to outdoors from the exhaust opening 120w of the cascade casing 2x is directly taken into the front surface opening 120y of the cascade casing 2x.

(13-4) Another Embodiment D

In the above embodiment, description has been made by exemplifying the refrigeration cycle apparatus 1 in which one cascade unit 2 is connected to one primary-side unit 5.

Figure 13:
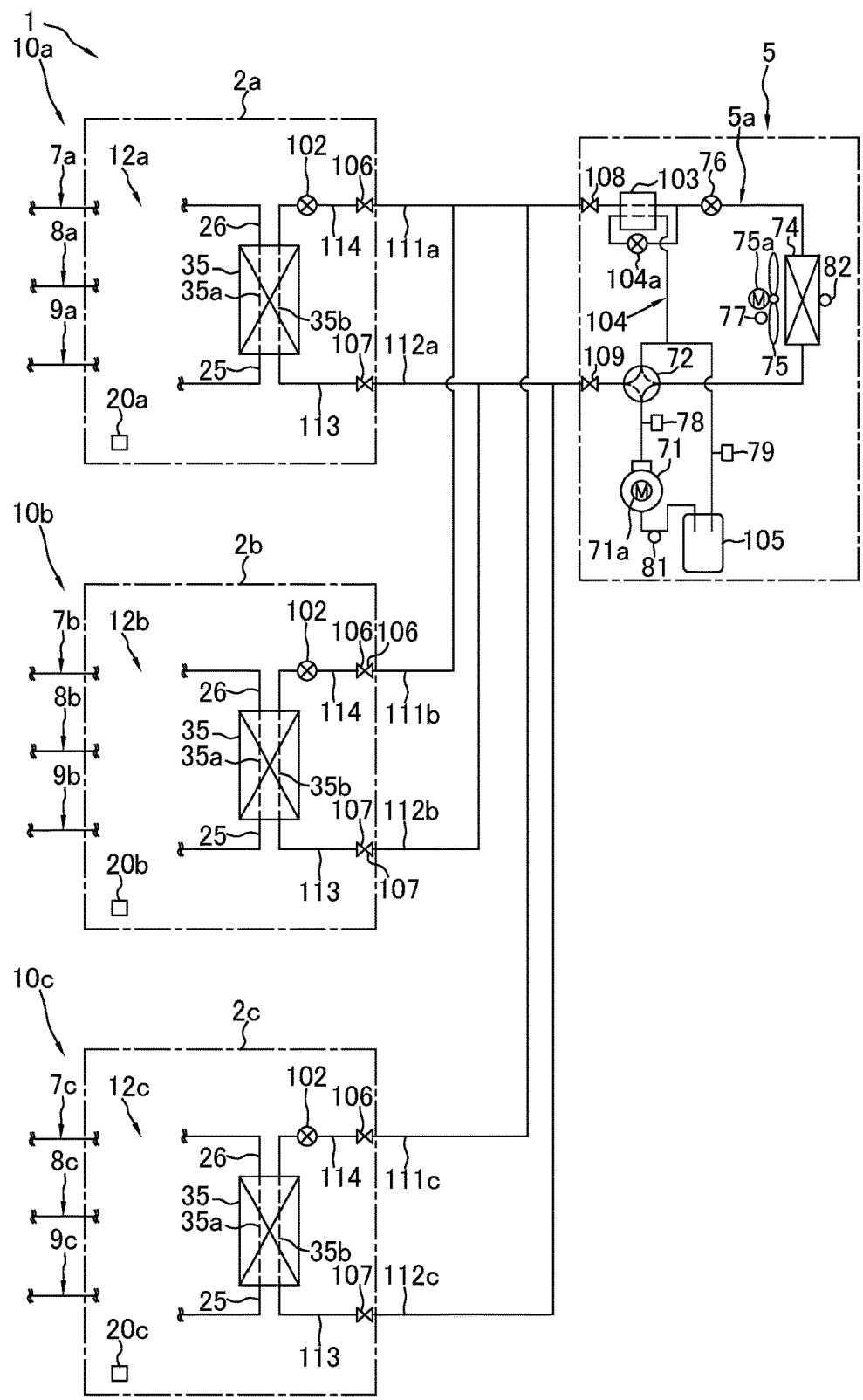
FIG. 13 is a schematic configuration diagram of a refrigeration cycle apparatus according to another embodiment D.

Alternatively, as illustrated in FIG. 13, for example, by connecting are a plurality of cascade units, namely, a first cascade unit 2a, a second cascade unit 2b, and a third cascade unit 2c, in parallel to each other to one primary-side unit 5, the refrigeration cycle apparatus 1 may include a first secondary-side refrigerant circuit 10a including a first cascade circuit 12a, a second secondary-side refrigerant circuit 10b including a second cascade circuit 12b, and a third secondary-side refrigerant circuit 10c including a third cascade circuit 12c. Note that, in FIG. 13, an internal structure of each of the first cascade unit 2a, the second cascade unit 2b, and the third cascade unit 2c is similar to that of the cascade unit 2 according to the above embodiment, and thus only a part of each cascade unit is illustrated.

Although not illustrated, each of the first cascade unit 2a, the second cascade unit 2b, and the third cascade unit 2c is connected to the plurality of branch units 6a, 6b, and 6c and the plurality of utilization units 3a, 3b, and 3c as in the above embodiment. Specifically, the first cascade unit 2a is connected to a plurality of branch units and utilization units via a secondary-side third connection pipe 7a, a secondary-side first connection pipe 8a, and a secondary-side second connection pipe 9a. The second cascade unit 2b is connected, via a secondary-side third connection pipe 7b, a secondary-side first connection pipe 8b, and a secondary-side second connection pipe 9b, to a plurality of branch units and utilization units different from those connected to the first cascade unit 2a. The third cascade unit 2c is connected, via a secondary-side third connection pipe 7c, a secondary-side first connection pipe 8c, and a secondary-side second connection pipe 9c, to another plurality of branch units and utilization units different from those connected to the first cascade unit 2a and different from those connected to the second cascade unit 2b.

Here, the primary-side unit 5 and the first cascade unit 2a are connected via a primary-side first connection pipe 111a and a primary-side second connection pipe 112a. The primary-side unit 5 and the second cascade unit 2b are connected via a primary-side first connection pipe 111b branched from the primary-side first connection pipe 111a and a primary-side second connection pipe 112b branched from the primary-side second connection pipe 112a. The primary-side unit 5 and the third cascade unit 2c are connected via a primary-side first connection pipe 111c branched from the primary-side first connection pipe 111a and a primary-side second connection pipe 112c branched from the primary-side second connection pipe 112a.

Here, each of the first cascade unit 2a, the second cascade unit 2b, and the third cascade unit 2c includes a primary-side second expansion valve 102 whose opening degree is controlled by the first cascade unit 2a, the second cascade unit 2b, and the third cascade unit 2c. Furthermore, a first cascade-side control unit 20a included in the first cascade unit 2a, a second cascade-side control unit 20b included in the second cascade unit 2b, and a third cascade-side control unit 20c included in the third cascade unit 2c control the opening degree of the corresponding primary-side second expansion valve 102. Similarly to the above embodiment, each of the first cascade-side control unit 20a, the second cascade-side control unit 20b, and the third cascade-side control unit 20c controls the valve opening degree of the corresponding primary-side second expansion valve 102 on the basis of conditions of the first cascade circuit 12a, the second cascade circuit 12b, and the third cascade circuit 12c controlled by the first cascade-side control unit 20a, the second cascade-side control unit 20b, and the third cascade-side control unit 20c. As a result, the primary-side refrigerant flowing through the primary-side refrigerant circuit 5a is controlled to have a flow rate of the primary-side refrigerant in the primary-side first connection pipe 111a and the primary-side second connection pipe 112a, a flow rate of the primary-side refrigerant in the primary-side first connection pipe 111b and the primary-side second connection pipe 112b, and a flow rate of the primary-side refrigerant in the primary-side first connection pipe 111c and the primary-side second connection pipe 112c so as to correspond to a difference in loads in the first secondary-side refrigerant circuit 10a, the second secondary-side refrigerant circuit 10b, and the third secondary-side refrigerant circuit 10c.

(13-5) Another Embodiment E

In the above embodiment, R32 or R410A is exemplified as the refrigerant used in the primary-side refrigerant circuit 5a, and carbon dioxide is exemplified as the refrigerant used in the secondary-side refrigerant circuit 10.

Alternatively, the refrigerant provided in the primary-side refrigerant circuit 5a should not be limited, and examples of the refrigerant include HFC-32, an HFO refrigerant, a refrigerant obtained by mixing HFC-32 and the HFO refrigerant, carbon dioxide, ammonia, and propane.

Furthermore, instead of the primary-side refrigerant circuit 5a in which the refrigerant flows, a heat medium circuit in which a heat medium such as water or brine flows may be used. In this case, the heat medium circuit may include a heat source that functions as a heat source or a cold source, and a pump for circulating the heat medium. In this case, the flow rate can be adjusted by the pump, and the amount of heat can be controlled by the heat source or the cold source.

The refrigerant provided in the secondary-side refrigerant circuit 10 should not be limited, and examples of the refrigerant include HFC-32, an HFO refrigerant, a refrigerant obtained by mixing HFC-32 and the HFO refrigerant, carbon dioxide, ammonia, and propane.

Note that examples of the HFO refrigerant include HFO-1234yf and HFO-1234ze.

The same refrigerant or different refrigerants may be used in the primary-side refrigerant circuit 5a and the secondary-side refrigerant circuit 10. Preferably, the refrigerant used in the secondary-side refrigerant circuit 10 has at least one of lower global warming potential (GWP), lower ozone depletion potential (ODP), lower flammability, or lower toxicity than the refrigerant used in the primary-side refrigerant circuit 5a. Here, the flammability can be compared in accordance with classifications related to ASHRAE 34 flammability, for example. Note that the toxicity can be compared, for example, in accordance with classifications related to ASHRAE 34 safety grade. In particular, when an overall content volume of the secondary-side refrigerant circuit 10 is larger than an overall content volume of the primary-side refrigerant circuit 5a, by using the refrigerant lower than the refrigerant in the primary-side refrigerant circuit 5a in at least one of the global warming potential (GWP), the ozone depletion potential (ODP), the flammability, or the toxicity in the secondary-side refrigerant circuit 10, adverse effects when a leak occurs can be reduced.

(13-6) Others

The electric component may drive the compressor.

Note that the compressor may be located downstream of the electric component in the direction of the air flow generated by the fan in the cascade casing.

Note that a first refrigerant may flow in the first circuit, and a second refrigerant different from the first refrigerant may flow in the second circuit.

Supplementary Note

Although the embodiments of the present disclosure have been described above, it will be understood that various changes in form and details can be made without departing from the gist and scope of the present disclosure described in the claims.

REFERENCE SIGNS LIST

1: refrigeration cycle apparatus
2: cascade unit
2x: cascade casing
3a: first utilization unit
3b: second utilization unit
3c: third utilization unit
5: primary-side unit
5a: primary-side refrigerant circuit (first circuit)
5x: primary-side casing (first casing)
10: secondary-side refrigerant circuit (second circuit)
11a: cooling portion
12: cascade circuit
13a, 13b, 13c: utilization circuit
17: electric component cooling flow path
17a: electric component expansion valve
20: cascade-side control unit (control unit)
21: secondary-side compressor (compressor)
21a: compressor motor
22: secondary-side switching mechanism
22a: first switching valve
22b: second switching valve
22x: discharge-side connection portion
22y: suction-side connection portion
23: suction flow path
24: discharge flow path
25: third pipe
26: fourth pipe
27: fifth pipe
28: first pipe
29: second pipe
30: secondary-side accumulator
34: oil separator
35: cascade heat exchanger
35a: secondary-side flow path
35b: primary-side flow path
36: cascade expansion valve
37: secondary-side suction pressure sensor
38: secondary-side discharge pressure sensor
39: secondary-side discharge temperature sensor
45: secondary-side receiver
46: bypass circuit
46a: bypass expansion valve
47: secondary-side subcooling heat exchanger
48: secondary-side subcooling circuit
48a: secondary-side subcooling expansion valve
50a-c: utilization-side control unit
51a-c: utilization-side expansion valve
52a-c: utilization-side heat exchanger (second heat exchanger)
53a-c: indoor fan
58a, 58b, 58c: liquid-side temperature sensor
60a, 60b, 60c: branch unit control unit
66a, 66b, 66c: first regulating valve
67a, 67b, 67c: second regulating valve
68a, 68b, 68c: check valve
69a, 69b, 69c: bypass pipe
70: primary-side control unit
71: primary-side compressor (first compressor)
72: primary-side switching mechanism
74: primary-side heat exchanger (first heat exchanger)
76: primary-side first expansion valve
77: outdoor air temperature sensor
78: primary-side discharge pressure sensor
79: primary-side suction pressure sensor
80: control unit
81: primary-side suction temperature sensor
82: primary-side heat exchange temperature sensor
83: secondary-side cascade temperature sensor
84: receiver outlet temperature sensor
85: bypass circuit temperature sensor
86: subcooling outlet temperature sensor
87: subcooling circuit temperature sensor
88: secondary-side suction temperature sensor
90: electric component casing
90w: exhaust opening (first opening)
90y: front surface opening
90z: top surface opening (first opening)
91: first electric component (electric component)
92: second electric component (electric component)
93: third electric component (electric component)
94: electric component mounting plate
94a: ventilation opening
97: electric component fan (fan)
98: heat sink (heat dissipation fin)
102: primary-side second expansion valve
103: primary-side subcooling heat exchanger
104: primary-side subcooling circuit
104a: primary-side subcooling expansion valve
105: primary-side accumulator
111: primary-side first connection pipe
112: primary-side second connection pipe
113: first refrigerant pipe
114: second refrigerant pipe
120w: exhaust opening
120x: connection opening
120y: front surface opening (second opening)
120z: top surface opening

CITATION LIST

Patent Literature

Patent Literature 1: JP 2020-180709 A

The invention claimed is:

1. A cascade unit of a refrigeration cycle apparatus, the refrigeration cycle apparatus including:
   a first circuit including a first heat exchanger in which a heat medium carrying heat flows, the first heat exchanger causing a heat source and the heat medium to exchange heat with each other;
   a second circuit in which a refrigerant flows, the second circuit including a compressor and a second heat exchanger that exchanges heat with indoor air; and
   a cascade heat exchanger that exchanges heat between the heat medium flowing in the first circuit and the refrigerant flowing in the second circuit,
   the cascade unit comprising:
   the compressor configured to discharge the refrigerant in a supercritical state;
   the cascade heat exchanger;
   an electric component;
   a fan that generates an air flow around the electric component;
   a cascade casing that accommodates the compressor, the electric component, and the fan; and
   an electric component casing that accommodates the electric component and is disposed above the compressor,
   wherein the refrigerant is a refrigerant including a carbon dioxide refrigerant,
   the electric component casing houses the fan and an electric component mounting plate to which the electric component is mounted, and has a first surface located between the compressor and the electric component and has a bottom surface located between the compressor and the electric component,
   the electric component casing has an electric-component-casing-intake-opening,
   the cascade casing has a cascade-casing-intake-opening,
   the electric-component-casing-intake-opening and the cascade-casing-intake-opening overlap with each other in a front view of the cascade unit, and are configured to guide air outside the cascade casing into the electric component casing by driving of the fan,
   the guided air is directed by a ventilation opening of the electric component mounting plate to flow along opposite sides of the electric component mounting plate within the electric component casing, and
   the electric-component-casing-intake-opening is provided on neither the first surface nor the bottom surface.

2. The cascade unit according to claim 1, wherein the electric component casing is provided with a first opening, wherein
   the fan generates an air flow that sends air in the electric component casing to outside of the electric component casing through the first opening.

3. The cascade unit according to claim 2, wherein the electric component includes a heat dissipation fin located in the electric component casing.

4. The cascade unit according to claim 3, wherein the compressor is not located upstream of the electric component in a direction of the air flow generated by the fan in the cascade casing.

5. The cascade unit according to claim 3, wherein
   the first circuit includes a first compressor,
   the first heat exchanger exchanges heat with outdoor air, and
   the refrigeration cycle apparatus includes a first casing that accommodates the first compressor and the first heat exchanger.

6. A refrigeration cycle apparatus, comprising the cascade unit according to claim 3.

7. The cascade unit according to claim 2, wherein the compressor is not located upstream of the electric component in a direction of the air flow generated by the fan in the cascade casing.

8. The cascade unit according to claim 2, wherein
   the first circuit includes a first compressor,
   the first heat exchanger exchanges heat with outdoor air, and
   the refrigeration cycle apparatus includes a first casing that accommodates the first compressor and the first heat exchanger.

9. A refrigeration cycle apparatus, comprising the cascade unit according to claim 2.

10. The cascade unit according to claim 1, wherein the compressor is not located upstream of the electric component in a direction of the air flow generated by the fan in the cascade casing.

11. The cascade unit according to claim 10, wherein
    the first circuit includes a first compressor,
    the first heat exchanger exchanges heat with outdoor air, and
    the refrigeration cycle apparatus includes a first casing that accommodates the first compressor and the first heat exchanger.

12. A refrigeration cycle apparatus, comprising the cascade unit according to claim 10.

13. The cascade unit according to claim 1, wherein
    the first circuit includes a first compressor,
    the first heat exchanger exchanges heat with outdoor air, and
    the refrigeration cycle apparatus includes a first casing that accommodates the first compressor and the first heat exchanger.

14. A refrigeration cycle apparatus, comprising the cascade unit according to claim 13.

15. A refrigeration cycle apparatus, comprising the cascade unit according to claim 1.

16. A cascade unit of a refrigeration cycle apparatus, the refrigeration cycle apparatus including:
    a first circuit including a first heat exchanger in which a heat medium carrying heat flows, the first heat exchanger causing a heat source and the heat medium to exchange heat with each other;
    a second circuit in which a refrigerant flows, the second circuit including a compressor and a second heat exchanger that exchanges heat with indoor air; and
    a cascade heat exchanger that exchanges heat between the heat medium flowing in the first circuit and the refrigerant flowing in the second circuit,
    the cascade unit comprising:
    the compressor configured to discharge the refrigerant in a supercritical state;
    the cascade heat exchanger,
    an electric component;
    a fan that generates an air flow around the electric component;
    a cascade casing that accommodates the compressor, the electric component, and the fan; and an electric component casing that accommodates the electric component and is disposed above the compressor, wherein the refrigerant is a refrigerant including a carbon dioxide refrigerant, the electric component casing houses the fan and an electric component mounting plate to which the electric component is mounted, and has a first surface located between the compressor and the electric component and has a bottom surface located between the compressor and the electric component, the bottom surface seals an inner space of the electric component casing from below, the electric component casing has an electric-component-casing-intake-opening, the cascade casing has a cascade-casing-intake-opening, the electric-component-casing-intake-opening and the cascade-casing-intake-opening are configured to guide air outside the cascade casing into the electric component casing by driving of the fan, the guided air is directed by a ventilation opening of the electric component mounting plate to flow along opposite sides of the electric component mounting plate within the electric component casing, and the electric-component-casing-intake-opening is provided on neither the first surface nor the bottom surface.

17. A cascade unit of a refrigeration cycle apparatus, the refrigeration cycle apparatus including:

a first circuit including a first heat exchanger in which a heat medium carrying heat flows, the first heat exchanger causing a heat source and the heat medium to exchange heat with each other;

a second circuit in which a refrigerant flows, the second circuit including a compressor and a second heat exchanger that exchanges heat with indoor air; and a cascade heat exchanger that exchanges heat between the heat medium flowing in the first circuit and the refrigerant flowing in the second circuit, the cascade unit comprising:

the compressor configured to discharge the refrigerant in a supercritical state;

the cascade heat exchanger;

an electric component;

a fan that generates an air flow around the electric component;

a cascade casing that accommodates the compressor, the electric component, and the fan; and an electric component casing that accommodates the electric component and is disposed above the compressor, wherein the refrigerant is a refrigerant including a carbon dioxide refrigerant, the electric component casing houses the fan and an electric component mounting plate to which the electric component is mounted, and has a first surface located between the compressor and the electric component and has a bottom surface located between the compressor and the electric component, the electric component casing has an electric-component-casing-intake-opening and a top surface opening, the electric component mounting plate is provided between the electric-component-casing-intake-opening and the top surface opening, the electric component mounting plate has a ventilation opening, the cascade casing has a cascade-casing-intake-opening, the electric-component-casing-intake-opening and the cascade-casing-intake-opening are configured to guide air outside the cascade casing into the electric component casing by driving of the fan, and the electric-component-casing-intake-opening is provided on neither the first surface nor the bottom surface.

* * * * *